United States Patent
Okubo et al.

(10) Patent No.: US 11,355,812 B2
(45) Date of Patent: Jun. 7, 2022

(54) BATTERY STORAGE DEVICE OF VEHICLE

(71) Applicant: HONDA MOTOR CO., LTD., Tokyo (JP)

(72) Inventors: Katsuyuki Okubo, Wako (JP); Yasuyuki Maeda, Wako (JP); Akira Kuramochi, Wako (JP); Takeo Numata, Wako (JP); Michito Arai, Wako (JP); Yuji Hayashi, Wako (JP); Tadashi Minyu, Wako (JP); Natsuko Sota, Wako (JP); Yasushi Takahashi, Wako (JP); Takaaki Kato, Wako (JP); Kazuo Tsuji, Wako (JP); Makoto Mitsukawa, Wako (JP); Etsumi Handa, Wako (JP); Nobuo Shigemizu, Wako (JP); Yasuhiro Fukuyoshi, Wako (JP); Yukio Akai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 143 days.

(21) Appl. No.: 16/644,181

(22) PCT Filed: Sep. 29, 2017

(86) PCT No.: PCT/JP2017/035740
§ 371 (c)(1),
(2) Date: Mar. 4, 2020

(87) PCT Pub. No.: WO2019/064596
PCT Pub. Date: Apr. 4, 2019

(65) Prior Publication Data
US 2021/0066678 A1    Mar. 4, 2021

(51) Int. Cl.
*H01M 50/244* (2021.01)
*B62J 43/23* (2020.01)
(Continued)

(52) U.S. Cl.
CPC ......... *H01M 50/244* (2021.01); *B62J 9/30* (2020.02); *B62J 43/16* (2020.02); *B62J 43/20* (2020.02);
(Continued)

(58) Field of Classification Search
None
See application file for complete search history.

(56) References Cited

U.S. PATENT DOCUMENTS

| 6,679,532 B2 | 1/2004 | Inoue |
| 2008/0173704 A1 * | 7/2008 | Forthaus ............ B65D 5/28 229/117.24 |

(Continued)

FOREIGN PATENT DOCUMENTS

| CN | 1293125 | 5/2001 |
| CN | 1412054 | 4/2003 |

(Continued)

OTHER PUBLICATIONS

Extended European Search Report for European Application No. 17926617.6 dated Jul. 20, 2020.
(Continued)

*Primary Examiner* — Gregg Cantelmo
(74) *Attorney, Agent, or Firm* — Amin, Turocy & Watson, LLP

(57) ABSTRACT

A device includes a battery case (42) that stores a battery (62A or 62B), a lock mechanism (133) that is capable of fixing and holding the stored battery (62A or 62B) in the battery case (42), and an operation member (44) that is capable of performing switching operation of the lock mechanism (133) between a battery-fixed state and a non-battery-fixed state. The lock mechanism (133) includes a movable block (160) which is supported by the battery case (42) in a displaceable manner. The movable block (160) has
(Continued)

a battery restriction portion (160*b* or 160*c*) which restricts displacement of the battery (62A or 62B) in a separation direction in a state of being displaced to a battery fixing position, and a holding force receiving portion (160*d*) which receives a holding force for maintaining the movable block (160) at the battery fixing position from the operation member (44) in a state where the operation member (44) is operated within a predetermined positional range.

8 Claims, 28 Drawing Sheets

(51) Int. Cl.
  *B62J 43/16* (2020.01)
  *H01M 50/249* (2021.01)
  *H01M 50/262* (2021.01)
  *B62J 9/30* (2020.01)
  *B62J 43/20* (2020.01)
(52) U.S. Cl.
  CPC ........... *B62J 43/23* (2020.02); *H01M 50/249* (2021.01); *H01M 50/262* (2021.01); *H01M 2220/20* (2013.01)

(56) References Cited

U.S. PATENT DOCUMENTS

| | | |
|---|---|---|
| 2013/0280572 A1 | 10/2013 | Kawatani |
| 2015/0122569 A1 | 5/2015 | Miyashiro et al. |
| 2016/0280306 A1 | 9/2016 | Miyashiro et al. |

FOREIGN PATENT DOCUMENTS

| | | |
|---|---|---|
| CN | 101423083 | 5/2009 |
| CN | 201405719 | 2/2010 |
| CN | 102910057 | 2/2013 |
| CN | 103358869 | 10/2013 |
| DE | 102004047339 | 3/2006 |
| EP | 1092826 | 4/2001 |
| EP | 1215111 | 6/2002 |
| EP | 2279981 | 2/2011 |
| EP | 3067259 | 9/2016 |
| JP | 09-011759 | 1/1997 |
| JP | 09-216588 | 8/1997 |
| JP | 11-129959 | 5/1999 |
| JP | 2000-253591 | 9/2000 |
| JP | 2011-152901 | 8/2011 |
| JP | 2013-208935 | 10/2013 |
| JP | 2013-209039 | 10/2013 |
| JP | 2015-089754 | 5/2015 |
| JP | 5879176 | 3/2016 |
| WO | 2012/043518 | 4/2012 |
| WO | 2015/068753 | 5/2015 |
| WO | 2017/022394 | 2/2017 |

OTHER PUBLICATIONS

International Search Report and Written Opinion for International Application No. PCT/JP2017/035740 dated Dec. 5, 2017, 9 pages.
Extended European Search Report for European Patent Application No. 17926617.6 dated Jan. 20, 2021.
Chinese Office Action for Chinese Application No. 201780095097.0 dated Jan. 8, 2021.
Japanese Office Action for Japanese Application No. 2019-544193 dated Feb. 2, 2021.
Chinese Notice of Allowance for Chinese Patent Application No. 201780095097.0 dated Nov. 3, 2021.

\* cited by examiner

FIG. 20
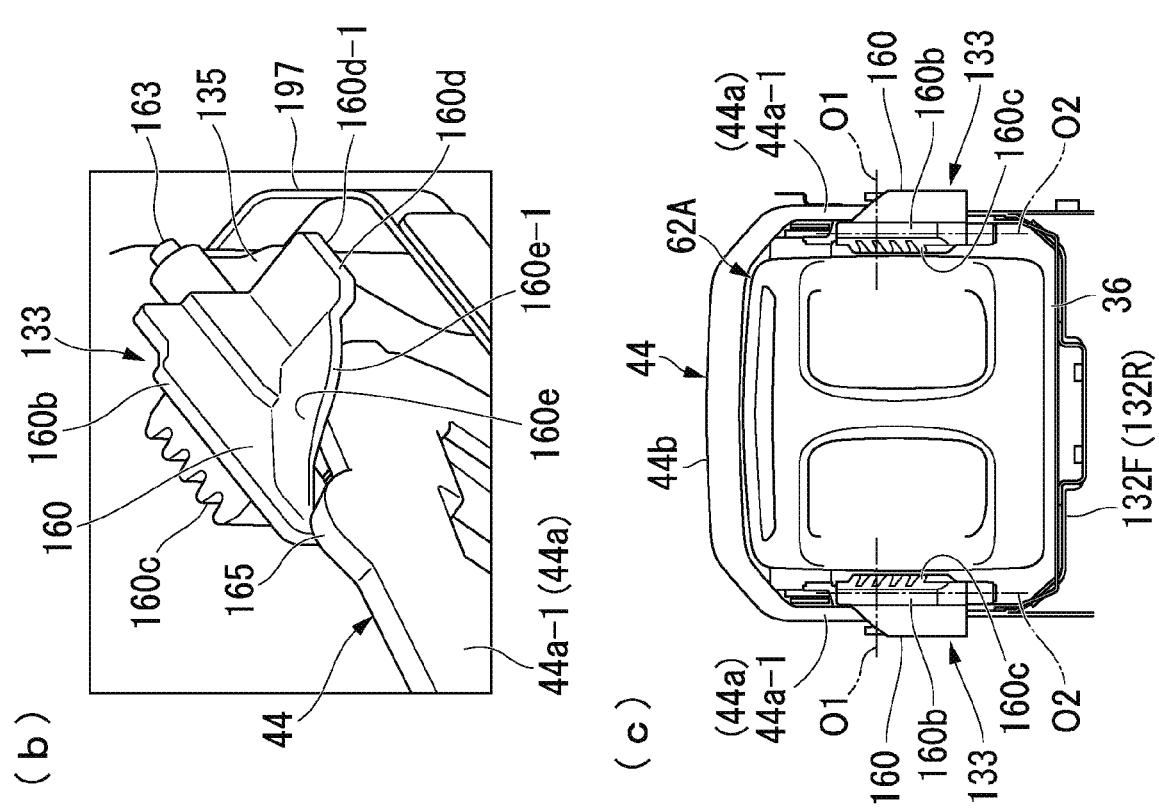
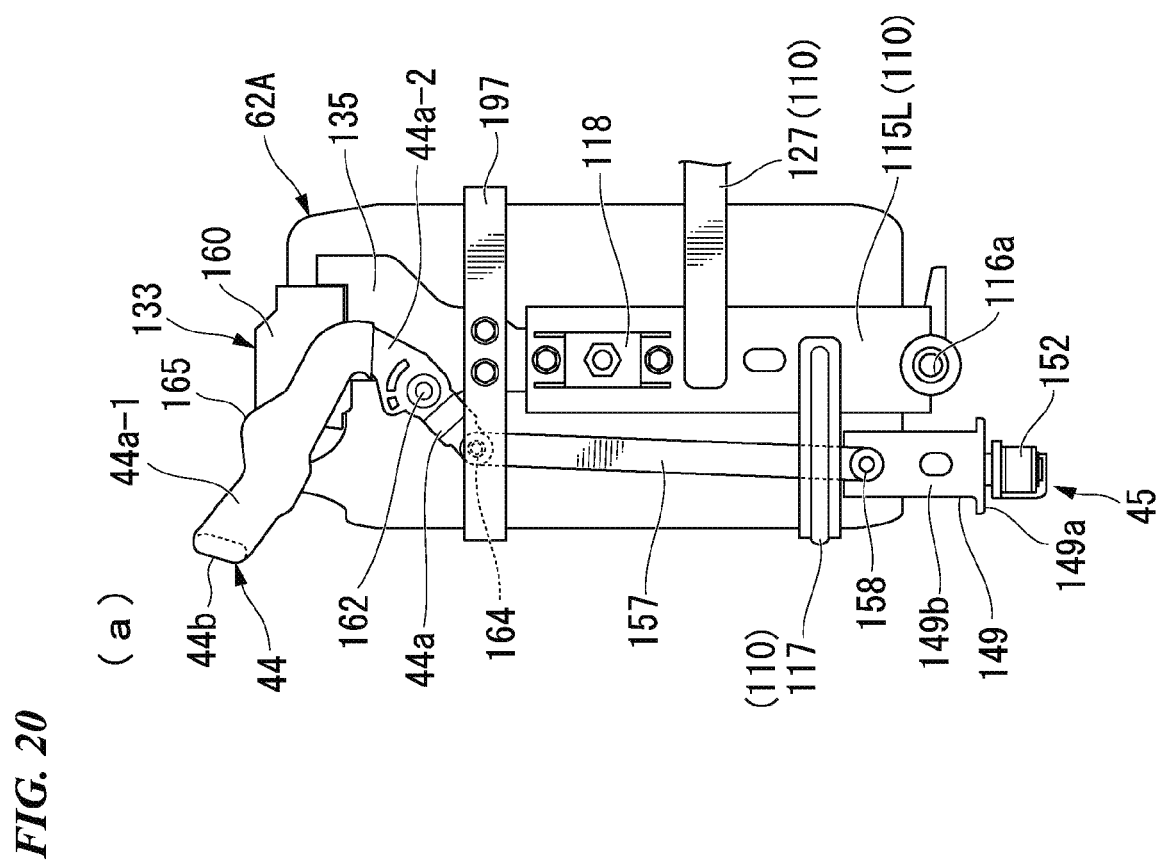

BATTERY STORAGE DEVICE OF VEHICLE

TECHNICAL FIELD

The present invention relates to a battery storage device of a vehicle storing a battery in an attachable/detachable manner.

BACKGROUND ART

In some electric motorcycles and the like, a battery is mounted in a vehicle in an attachable/detachable manner such that the battery can be detached from a vehicle body at the time of charging or the like of the battery.

Regarding battery storage devices employed in vehicles of this kind, battery storage devices in which a lid member covering an upper part of a storage opening of a battery case has a function of fixing a battery and displacement of the battery is restricted by fixing the lid member in a state of being closed are known.

However, in vehicles in which an input of significant vibration is predicted during traveling, it is difficult to sufficiently curb vibration of a battery by restricting displacement of the battery using a lid member. For this reason, development of a battery storage device capable of fixing a battery more firmly is desired.

CITATION LIST

Patent Literature

Patent Literature 1

PCT International Patent Application, Publication No. WO2015/068753

SUMMARY OF INVENTION

Technical Problem

A problem to be resolved is to be able to firmly fix a battery to a battery case.

Solution to Problem

According to an aspect of the present invention, there is provided a battery storage device of a vehicle including a battery case (42) that stores a battery (62A or 62B), a lock mechanism (133) that is capable of fixing and holding the stored battery (62A or 62B) in the battery case (42), and an operation member (44) that is capable of performing switching operation of the lock mechanism (133) between a battery-fixed state and a non-battery-fixed state. The lock mechanism (133) includes a movable block (160) which is supported by the battery case (42) in a displaceable manner. The movable block (160) has a battery restriction portion (160b or 160c) which restricts displacement of the battery (62A or 62B) in a separation direction in a state of being displaced to a battery fixing position, and a holding force receiving position (160d) which receives a holding force for maintaining the movable block (160) at the battery fixing position from the operation member (44) in a state where the operation member (44) is operated within a predetermined positional range.

According to the foregoing constitution, when the battery (62A or 62B) is fixed, first, the battery (62A or 62B) is stored inside the battery case (42), and the operation member (44) is operated up to a predetermined positional range in the state thereof. Accordingly, the movable block (160) is displaced to the battery fixing position, and a holding force is applied from the operation member (44) to the holding force receiving portion (160d) of the movable block (160) in the state thereof. Accordingly, the battery restriction portion (160b or 160c) of the movable block (160) is held in a state where displacement of the battery (62A or 62B) in the separation direction is restricted.

In the battery storage device of a vehicle according to the aspect of the present invention, the operation member (44) is turnably supported about a first turning shaft (162). The movable block (160) is turnably supported about a second turning shaft (163) orthogonal to the first turning shaft (162).

In this case, the first turning shaft (162) turnably supporting the operation member (44) and the second turning shaft (163) turnably supporting the movable block (160) are orthogonal to each other. Therefore, when a load in the separation direction is input to the movable block (160) from the battery (62A or 62B) in a state where displacement of the battery (62A or 62B) in the separation direction is restricted by the battery restriction portion (160b or 160c) of the movable block (160), the operation member (44) is unlikely to be displaced integrally with the movable block (160). Therefore, when this form is employed, displacement of the battery (62A or 62B) in the separation direction can be restricted advantageously.

In the battery storage device of a vehicle according to the aspect of the present invention, the movable block (160) has a cam surface (160e-1) which comes into slide contact with the operation member (44) and receives a turning operation force toward the battery fixing position from the operation member (44) when the operation member (44) turns in one direction about the first turning shaft (162), and the cam surface (160e-1) is continuously formed with the holding force receiving portion (160d).

In this case, when the operation member (44) is turnably operated, the operation member (44) firstly comes into slide contact with the cam surface (160e-1) of the movable block (160) and turns the movable block (160) to the battery fixing position. Thereafter, the operation member (44) abuts the holding force receiving portion (160d), such that the movable block (160) is maintained at the battery fixing position. Therefore, when this form is employed, it is possible to smoothly perform turning displacement of the movable block (160) to the battery fixing position and maintain a fixed state of the battery (62A or 62B) through continuous operation of the operation member (44).

In the battery storage device of a vehicle according to the aspect of the present invention, the first turning shaft (162) is disposed such that an axis (o1) of the first turning shaft (162) overlaps the battery (62A or 62B) stored in the battery case (42). The second turning shaft (163) is disposed such that an axis (o2) of the second turning shaft (163) is positioned on an outward side of the battery (62A or 62B) stored in the battery case (42).

In this case, since a turning center of the operation member (44) is disposed at a position which does not significantly deviate from the center of gravity of the battery (62A or 62B) that is a heavy article, the operation member (44) can be stably subjected to turning operation. In addition, in this case, since a rotation center of the movable block (160) is positioned on the outward side of the battery (62A or 62B) inside the battery case (42), it is possible to easily avoid interference of the movable block (160) with the battery (62A or 62B) and when the battery (62A or 62B) is inserted into the battery case (42) or is taken out from the battery case (42).

In the battery storage device of a vehicle according to the aspect of the present invention, the battery restriction portion (160b or 160c) is constituted to be positioned on the outward side of the battery (62A or 62B) in the non-battery-fixed state in a view in an insertion direction of the battery (62A or 62B) and to overlap the battery (62A or 62B) in the battery-fixed state.

In this case, interference of the battery restriction portion (160b or 160c) of the movable block (160) with the battery (62A or 62B) can be avoided when the battery (62A or 62B) is inserted into the battery case (42) or is taken out from the battery case (42), and displacement of the battery (62A or 62B) in the separation direction can be restricted by the battery restriction portion (160b or 160c) when the battery (62A or 62B) is fixed to the battery case (42).

In the battery storage device of a vehicle according to the aspect of the present invention, the holding force receiving portion (160d) is constituted to overlap the operation member (44) in the battery-fixed state in a view in a direction along the first turning shaft (162).

In this case, in a view in a direction along the first turning shaft (162), when the operation member (44) overlaps the holding force receiving portion (160d) of the movable block (160), a holding force for maintaining the battery (62A or 62B) at the battery fixing position acts on the holding force receiving portion (160d) from the operation member (44).

In the battery storage device of a vehicle according to the aspect of the present invention, an occupant seat (8) is provided to be turnably flipped up above the battery case (42). The seat (8) is provided with projections (171A and 171B) which do not come into contact with the operation member (44) when the seat (8) is closed in a state where the operation member (44) is turnably operated to a regular position at which the operation member (44) is in the battery-fixed state and abuts the operation member (44) when the seat (8) is closed in a state where the operation member (44) is at a half-fixed position before the operation member (44) arrives at the regular position.

In this case, when the operation member (44) is reliably subjected to turning operation to the regular position at which the operation member (44) is in the battery-fixed state, the seat (8) is smoothly closed without causing the projections (171A and 171B) and the operation member (44) to come into contact with each other. Meanwhile, when the operation member (44) is in a state at the half-fixed position, the projections (171A and 171B) abut the operation member (44), so that a worker can be informed of insufficient turning operation. In addition, depending on a turning stop position of the operation member (44), the operation member (44) can also be thrust to the regular position due to pressing of the operation member (44) by the projections (171A and 171B).

Advantageous Effects of Invention

In the battery storage device of a vehicle of the present invention, displacement of a battery in the separation direction is restricted by the battery restriction portion of the movable block in a state where the movable block is displaced to the battery fixing position, and the movable block can be maintained at the battery fixing position by the holding force receiving portion of the movable block receiving a holding force from the operation member in the state thereof. Therefore, when the present invention is employed, a battery can be firmly fixed to the battery case.

BRIEF DESCRIPTION OF DRAWINGS

FIG. 20 is a combined view including a side view (a), a perspective view (b), and a top view (c) of the battery storage device according to the embodiment when a battery is inserted thereinto.

DESCRIPTION OF EMBODIMENT

Hereinafter, an embodiment of the present invention will be described with reference to the drawings. Unless otherwise specified in the following description, directions to the front, the rear, the left, the right, and the like are the same as directions in a vehicle, which will be described below. In addition, an arrow FR indicating the front side of the vehicle, an arrow LH indicating the left side of the vehicle, and an arrow UP indicating the upper side of the vehicle are marked in suitable places in the diagrams used in the following description.

Figure 1:
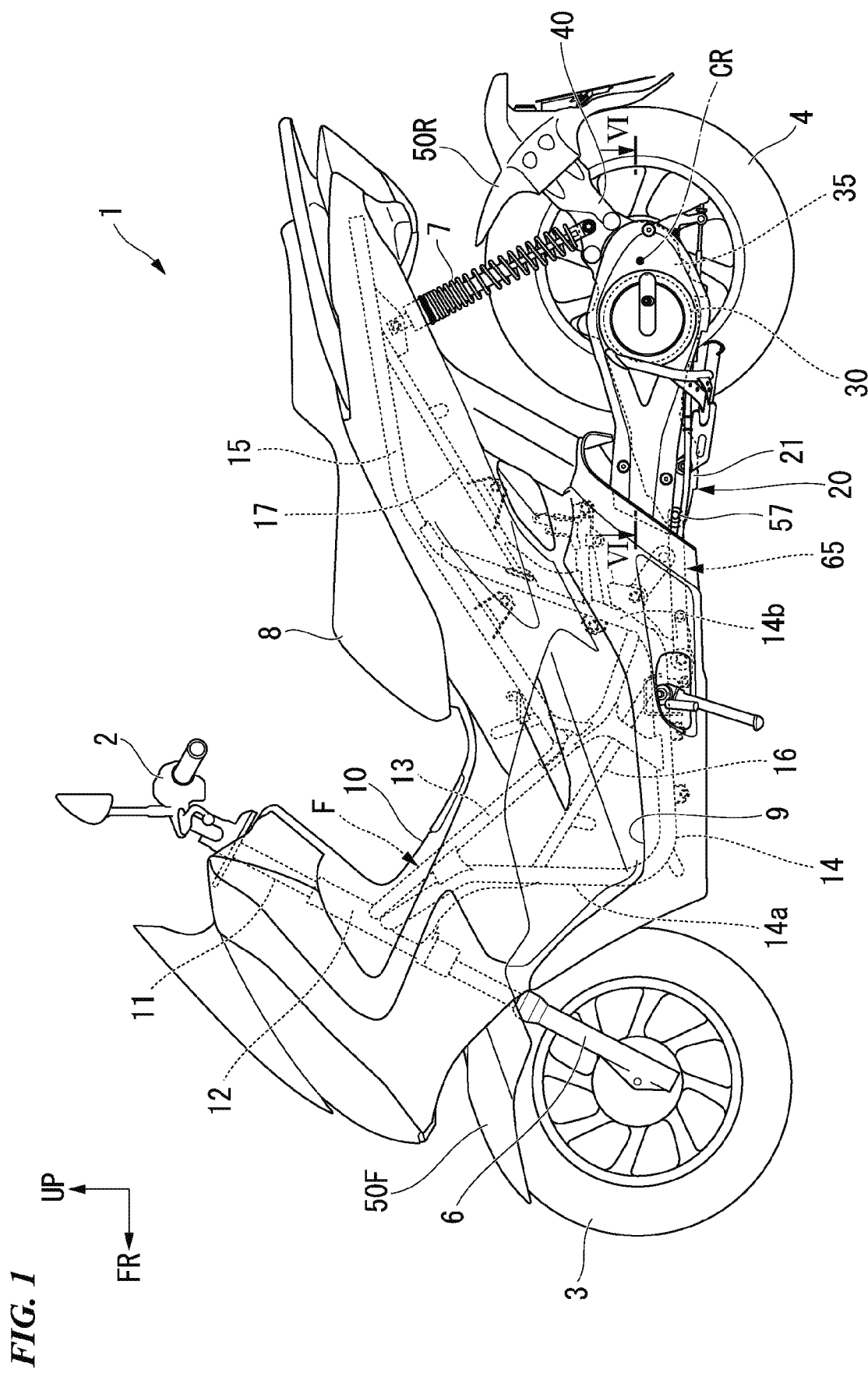
FIG. 1 is a left side view of a saddle-type electric vehicle according to the embodiment.

FIG. 1 is view illustrating a left side surface of an electric motorcycle 1 which is a form of a saddle-type electric vehicle. The motorcycle 1 of the present embodiment is a scooter-type vehicle having step floors 9 on which a rider sitting on a seat 8 puts soles of his/her feet.

The motorcycle 1 includes a front wheel 3 which serves as a steered wheel and a rear wheel 4 which serves as a driving wheel. The front wheel 3 is rotatably supported by a pair of left and right front forks 6. In addition, the front wheel 3 can be steered by a steering bar handle 2. A front fender 50F covering an upper side of the front wheel 3 is supported by the front forks 6.

The rear wheel 4 is supported by a rear portion of a swing arm 20 which is oscillatably supported by a vehicle body frame F. The motorcycle 1 of the present embodiment is a unit swing-type motorcycle. An electric motor 30 for driving the vehicle and a deceleration mechanism 35 (refer to FIG. 6) for decelerating a driving force of the electric motor 30 and transmitting it to a rear wheel axle 4a are mounted in the swing arm 20. A rear fender 50R covering an upper rear portion of the rear wheel 4 is supported by a rear end portion of the swing arm 20 with fender support arms 40 therebetween. Lower end portions of rear cushions 7 (suspension components on the rear side) are joined to the fender support arms 40.

In addition, the motorcycle 1 includes a pair of left and right step floors 9 on which a rider sitting on the seat 8 puts soles of his/her feet, and a center tunnel 10 which extends in a vehicle front-rear direction between the left and right step floors 9. The center tunnel 10 is formed to be lower than the seat 8 on the front side of the seat 8. A space portion of the center tunnel 10 on the upper side forms a straddling space between the steering bar handle 2 and the seat 8 for a rider straddling a vehicle body.

Figure 2:
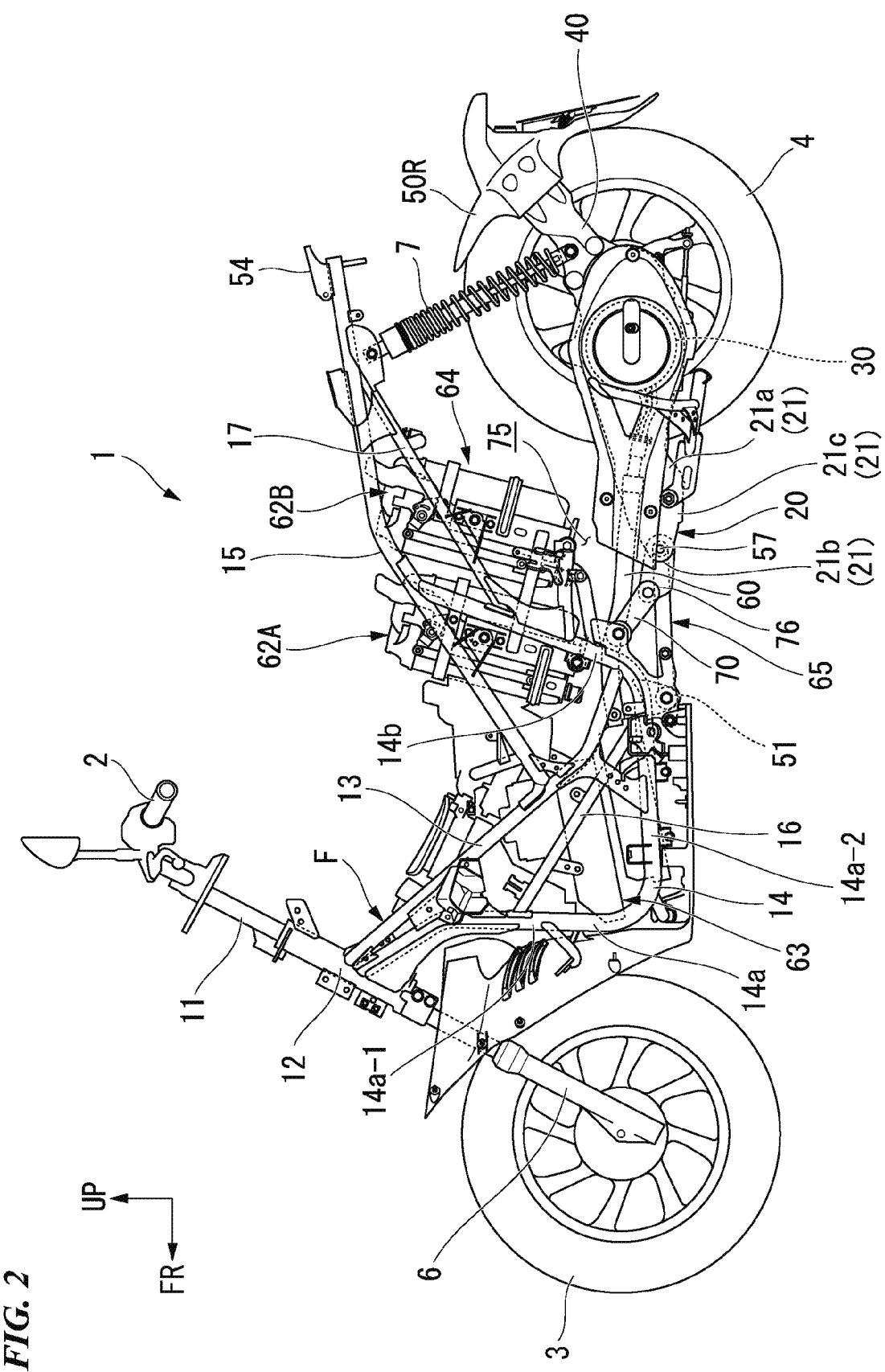
FIG. 2 is a left side view of the saddle-type electric vehicle according to the embodiment from which some parts are removed.
Figure 3:
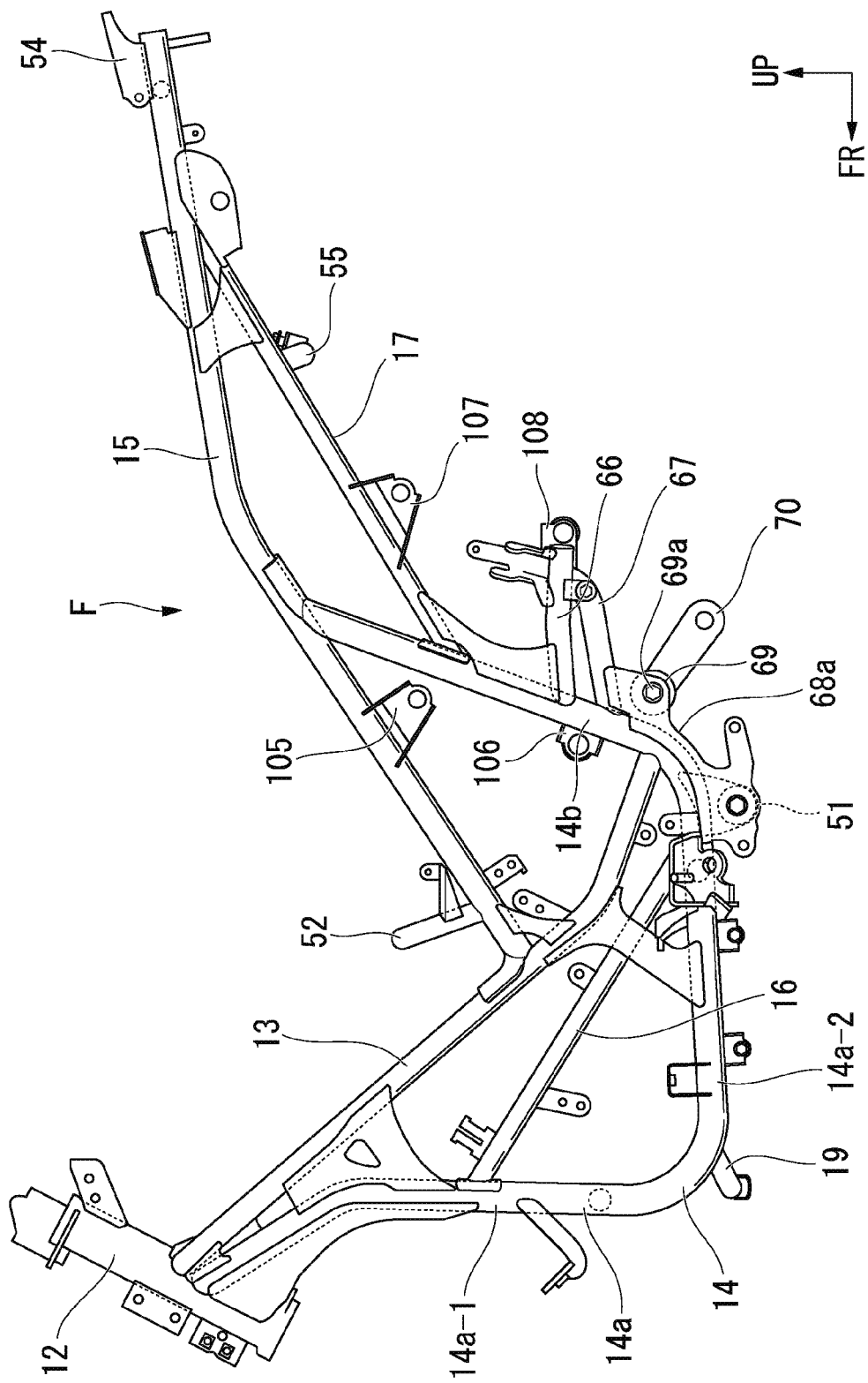
FIG. 3 is a left side view of a vehicle body frame of the saddle-type electric vehicle according to the embodiment.
Figure 4:
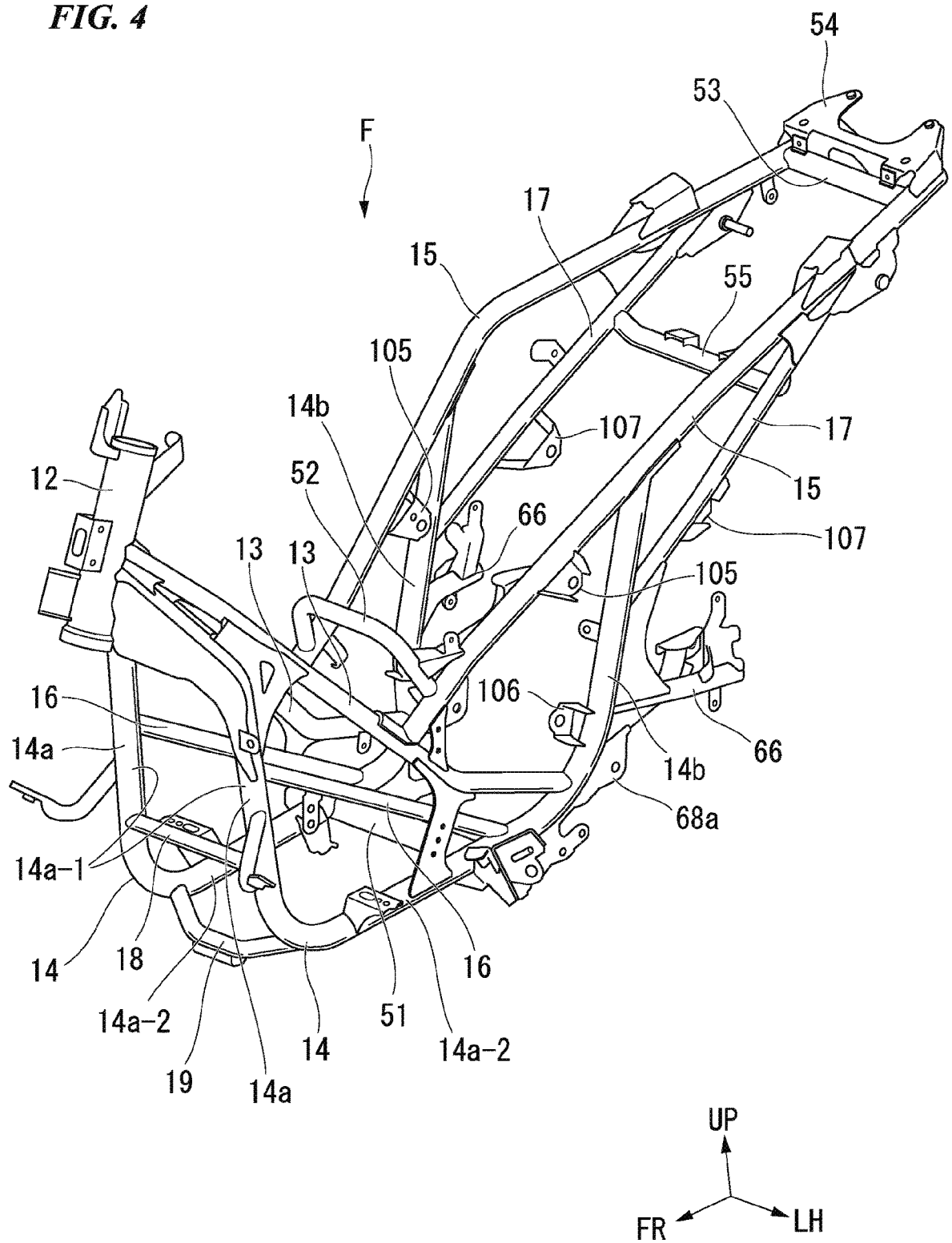
FIG. 4 is a perspective view of the vehicle body frame of the saddle-type electric vehicle according to the embodiment.
Figure 5:
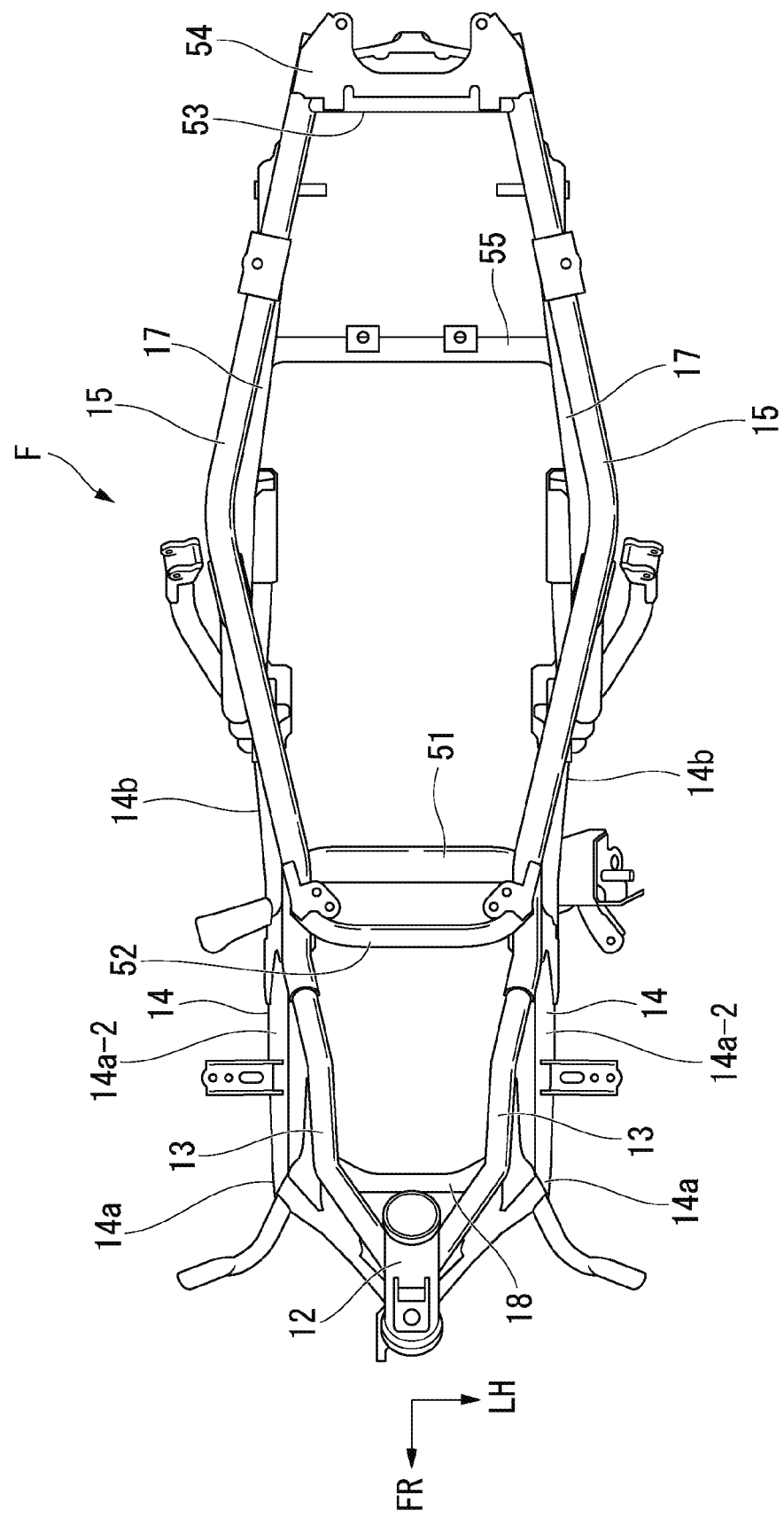
FIG. 5 is a top view of the vehicle body frame of the saddle-type electric vehicle according to the embodiment.

FIG. 2 is a left side view of the motorcycle 1 from which the seat 8 and covers are removed. FIG. 3 is a view of the vehicle body frame F of the motorcycle 1 viewed from the left side, and FIG. 4 is a view of the vehicle body frame F viewed from above in front on the left. In addition, FIG. 5 is a view of the vehicle body frame F viewed from above.

The vehicle body frame F is formed by integrally interlinking steel bodies of a plurality of kinds through welding or the like. The vehicle body frame F includes a head pipe 12 in a front end portion. The head pipe 12 holds the front wheel 3 in a steerable manner with a steering stem 11 (refer to FIGS. 1 and 2) and the left and right front forks 6 therebetween.

The vehicle body frame F further includes a pair of left and right upper frames 13 which extend obliquely downward to the rear from a substantially intermediate region of the head pipe 12 in an up-down direction, a pair of left and right lower frames 14 which extend to the rear of the vehicle body after extending downward from a lower portion region of the head pipe 12 and extend upward in a state of inclining slightly rearward from the rear end portion thereof, and a pair of left and right seat frames 15 which extend obliquely upward to the rear from substantially intermediate positions in the left and right upper frames 13 in a front-rear direction. The lower frame 14 has a down frame portion 14a which extends downward to the rear from the head pipe 12, and a rear frame portion 14b extending upward from the rear portion of the down frame portion 14a.

An upper end portion of each of the left and right rear frame portions 14b is coupled to the corresponding left or right seat frame 15 at a substantially intermediate position in the front-rear direction. The seat 8 on which an occupant sits is attached to upper portions of the left and right seat frames 15. The seat 8 can be opened upward and closed downward using a front end side as a hinge pivot point.

In addition, rear end portions of the left and right upper frames 13 are coupled to parts in the vicinity of lower ends of the corresponding left and right rear frame portions 14b.

In each of the left and right lower frames 14, an upper portion region of a downward extending portion 14a-1 and a rear portion region of a rearward extending portion 14a-2 of the down frame portion 14a are joined to each other by a middle frame 16. The downward extending portions 14a-1 of the left and right down frame portions 14a are joined to each other by a front cross member 18. In addition, front end regions of the rearward extending portions 14a-2 of the left and right down frame portions 14a are joined to each other by a lower front cross member 19. Rear end regions of the rearward extending portions 14a-2 of the left and right down frame portions 14a are joined to each other by a cross frame 51. The front cross member 18 and the lower front cross member 19 are formed of round steel tubes having smaller diameters than the lower frames 14. The front cross member 18 extends linearly in a vehicle width direction, and the lower front cross member 19 extends in a curved shape projecting forward. The cross frame 51 extends linearly in the vehicle width direction and is formed of a round steel tube having substantially the same diameter as those of the lower frames 14.

In the left and right seat frames 15, front portion regions are joined to each other by a center cross member 52, and rear end portions are joined to each other by a rear cross member 53 and a rear cross plate 54. The center cross member 52 extends in a curved shape projecting upward to the front, and the rear cross member 53 extends linearly in the vehicle width direction. The center cross member 52 is formed of a round steel tube having a smaller diameter than the seat frames 15, and the rear cross member 53 is formed of a round steel tube having substantially the same diameter as those of the seat frames 15.

In addition, the rear frame portion 14b of each of the left and right lower frames 14 and the rear portion region of the corresponding left or right seat frame 15 are joined to each other by a support frame 17. The rear portion regions of the left and right support frames 17 are joined to each other by a rear cross member 55. The rear cross member 55 extends in a curved shape projecting downward. The rear cross member 55 is formed of a round steel tube having substantially the same diameter as those of the support frames 17.

Figure 6:
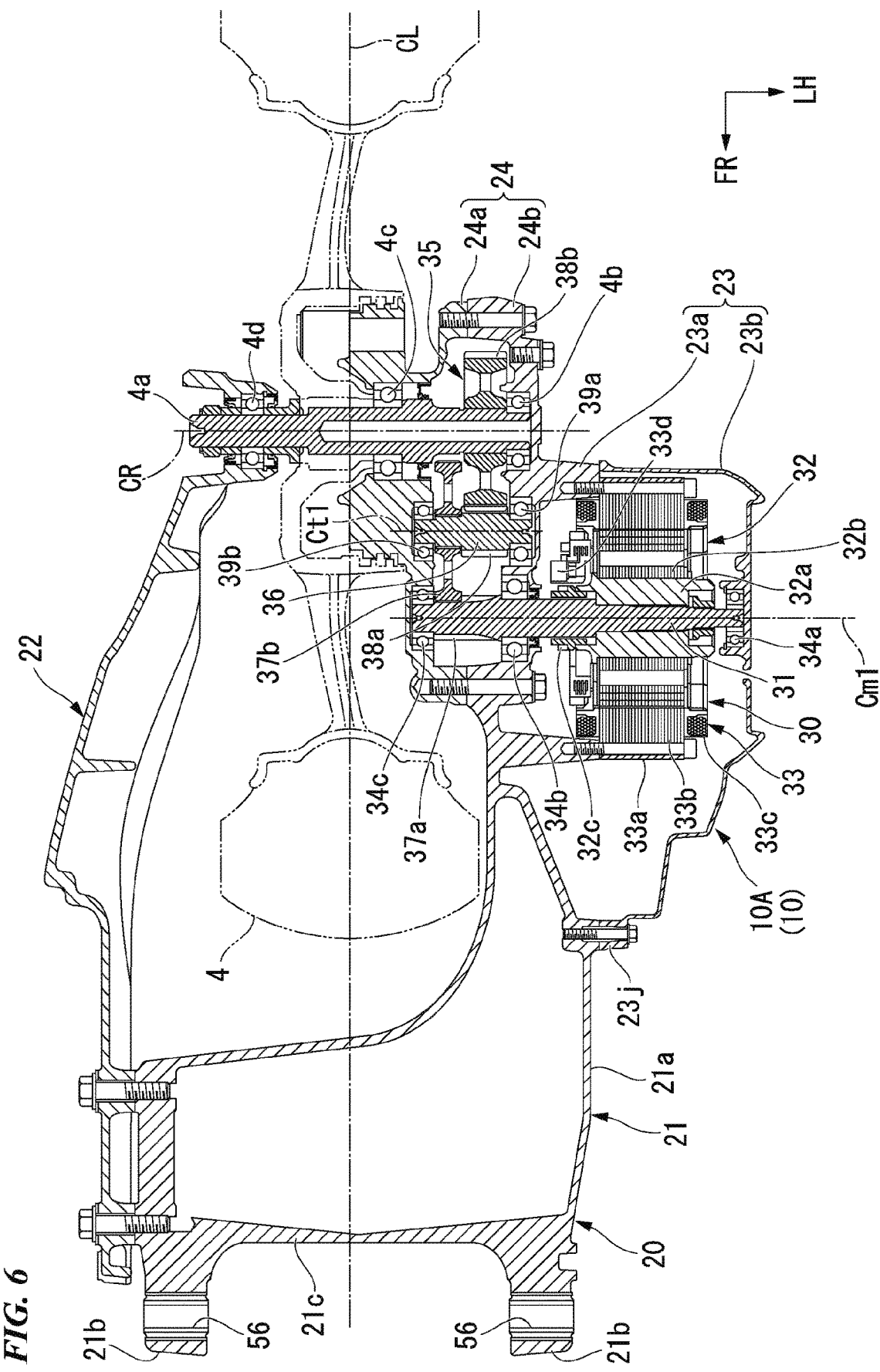
FIG. 6 is a cross-sectional view of the saddle-type electric vehicle according to the embodiment cut along line VI-VI in FIG. 1.

FIG. 6 is a view illustrating a cross section of the motorcycle 1 cut along line VI-VI in FIG. 1.

The swing arm 20 includes a main arm 21 which extends toward the left side of the rear wheel 4 from the front side of the rear wheel 4, and a sub-arm 22 which extends while being curved inward in the vehicle width direction toward the right side of the rear wheel 4 from a front right side portion of the main arm 21. In the diagram, the reference sign CL indicates a center line of the vehicle in the vehicle width direction.

A motor accommodation portion 23 for accommodating the electric motor 30 and a deceleration mechanism accommodation portion 24 for accommodating the deceleration mechanism 35 are provided in the main arm 21.

The motor accommodation portion 23 includes an inner cover 23a which covers the electric motor 30 from the inward side in the vehicle width direction, and an outer cover 23b which covers the electric motor 30 from the outward side in the vehicle width direction.

The inner cover 23a exhibits a box shape opening outward in the vehicle width direction. The inner cover 23a is formed integrally with an arm main body portion 21a of the main arm 21. The outer cover 23b is coupled to the inner cover 23a using fastening members such as bolts.

Figure 7:
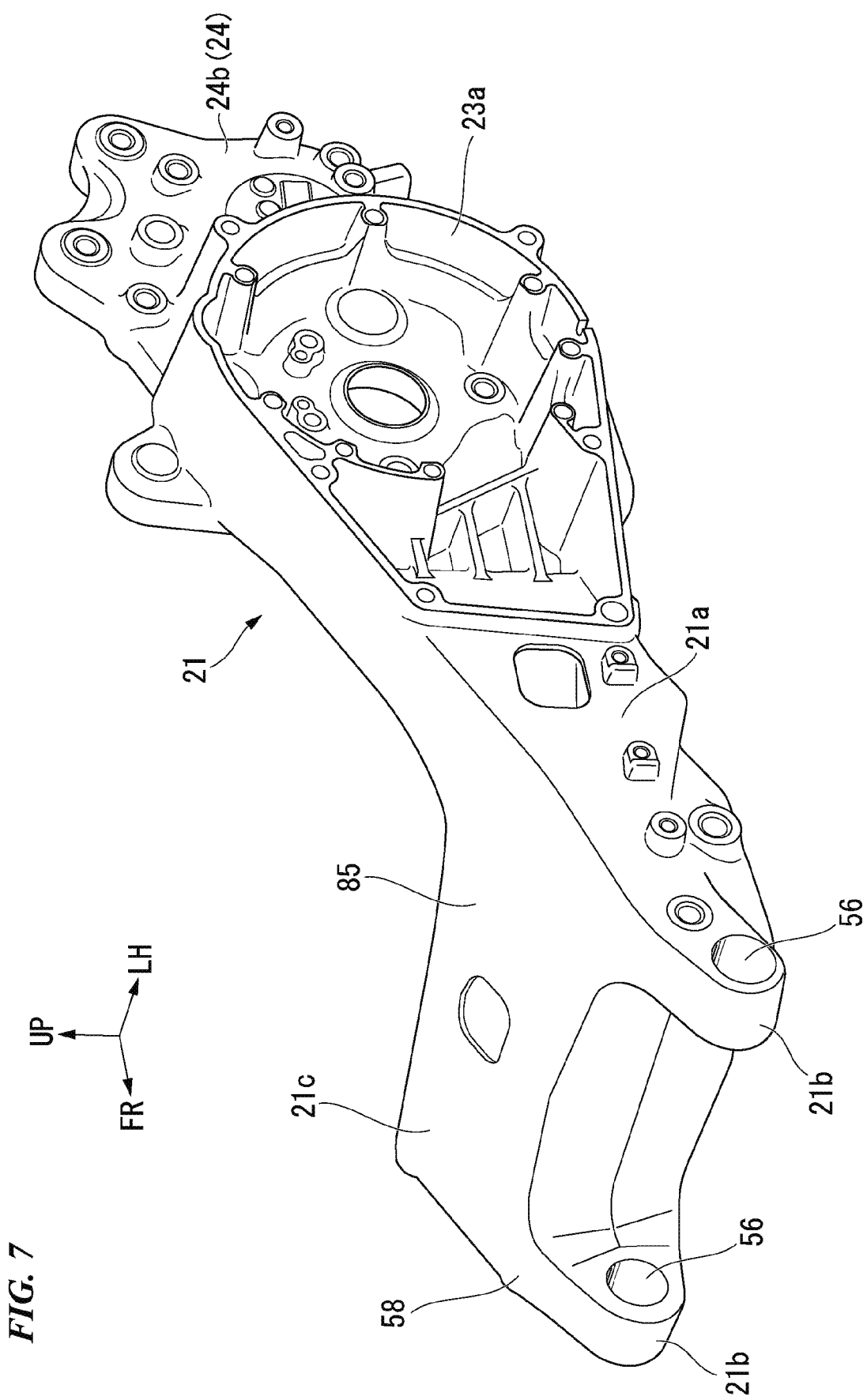
FIG. 7 is a perspective view of a main arm according to the embodiment viewed from above in front on the left side.

FIG. 7 is a view of the main arm 21 viewed from above in front on the left side.

As illustrated in FIGS. 6 and 7, the main arm 21 has an arm base portion 21c which extends in the vehicle width direction in front of the rear wheel 4, and the arm main body portion 21a which extends toward the rear side of the vehicle body from an end portion of the arm base portion 21c on the left side. The sub-arm 22 is coupled to a right side surface of the arm base portion 21c. Extending pieces 21b extending forward protrude in both left and right end portions of the arm base portion 21c. Insertion holes 56 are formed to penetrate the left and right extending pieces 21b in the vehicle width direction. A pivot 57 (which will be described below in detail) is turnably held in the insertion holes 56. An upper surface from the left and right extending pieces 21b to the arm base portion 21c extends in a manner of inclining upward to the rear. This part is an upward inclination portion 58 extending in a manner of inclining upward to the rear from a joint portion with respect to the pivot 57.

As illustrated in FIG. 6, the electric motor 30 is held by the main arm 21 of the swing arm 20 and is disposed on the left side of the rear wheel 4. The electric motor 30 is an inner rotor-type motor and includes an inner rotor 32 having a motor output shaft 31, and a stator 33. The electric motor 30 is disposed in a rear portion region of the main arm 21 of the swing arm 20.

The motor output shaft 31 is pivotally supported by the main arm 21 in the vehicle width direction. The motor output shaft 31 has an axis Cm1 (which will hereinafter be referred to as "a motor axis Cm1") parallel to a rear wheel axis CR (axis of the rear wheel axle 4a). The reference signs 34a to 34c in FIG. 6 indicate bearings rotatably supporting the motor output shaft 31.

The inner rotor 32 includes an inner rotor main body 32a which has a tubular shape, and a magnet 32b which is provided on an outer circumferential surface of the inner rotor main body 32a. A central portion of the inner rotor main body 32a in a radial direction is spline-coupled to the motor output shaft 31. A detection object 32c is attached to the outer circumferential surface of an inner end portion of the inner rotor main body 32a in the vehicle width direction.

The stator 33 includes an annular stator yoke 33a which is fixed to an outer circumferential wall of the inner cover 23a, a plurality of teeth 33b which are interlinked to the stator yoke 33a and are provided radially with respect to the motor axis Cm1, and coils 33c which are wound around the respective teeth 33b. A rotor sensor 33d detecting a rotation position of the inner rotor 32 by detecting the passing detection object 32c is attached to the stator yoke 33a.

Figure 8:
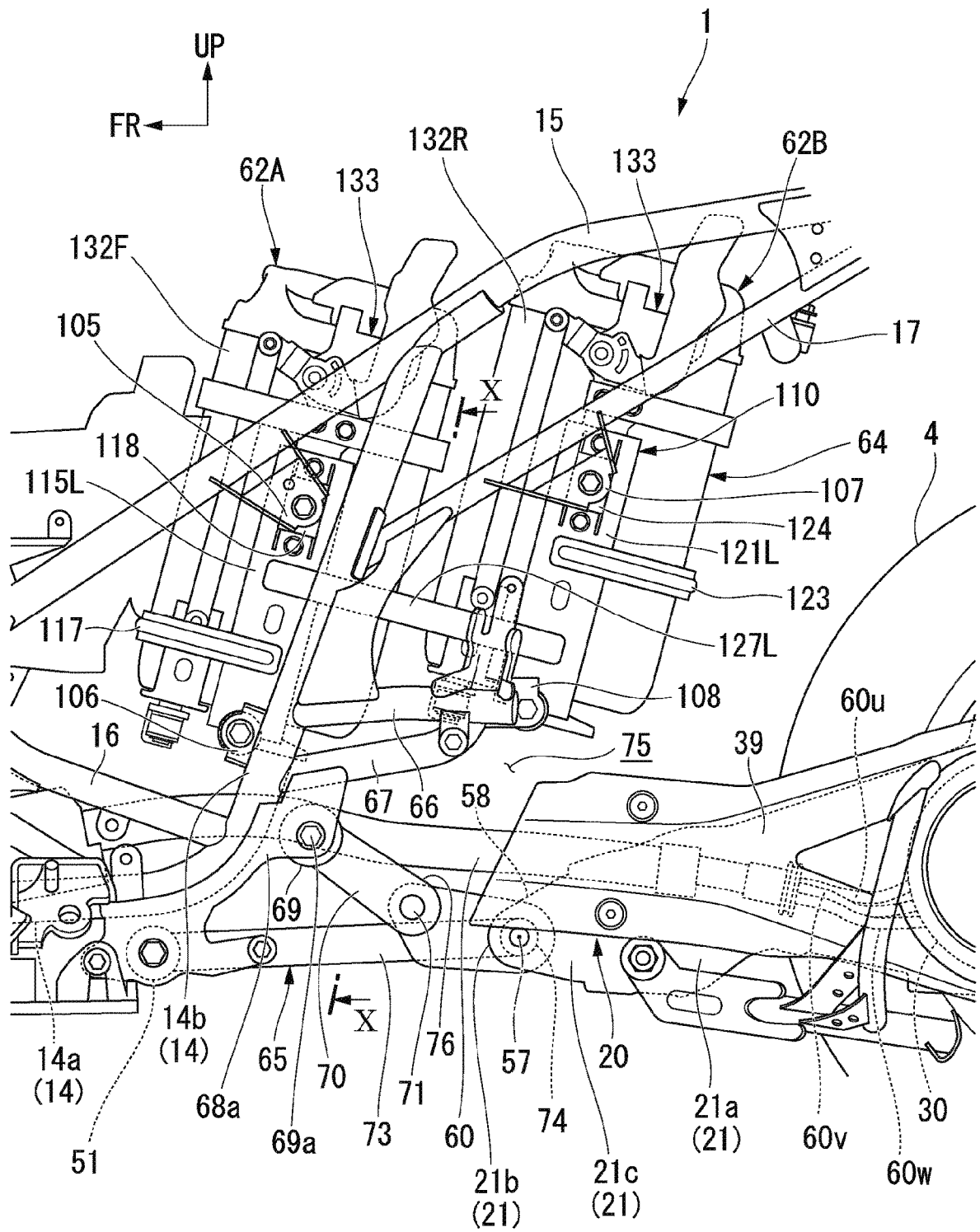
FIG. 8 is an enlarged side view illustrating a part of the saddle-type electric vehicle according to the embodiment in FIG. 2.

FIG. 8 is an enlarged view illustrating a part near a support portion of the swing arm 20 in FIG. 2.

As illustrated in the same diagram, an electric cable 60 is connected to the electric motor 30. The electric cable 60 is a cable for electrically connecting a power supply unit on the vehicle body frame F side and three-phase coils 33c of the electric motor 30 to each other, and a bundle of three-phase electric wires 60u, 60v, and 60w is surrounded and covered by a protective material 61 (refer to FIG. 11). The electric cable 60 has a thickness which is sufficiently thick, and the largest outer diameter of the protective material 61 is larger than an outer diameter of the pivot 57. The electric cable 60 connected to the electric motor 30 is drawn out forward along a side surface of the arm main body portion 21a of the swing arm 20 on the outward side in the vehicle width direction. As illustrated in FIG. 8, a wiring portion of the electric cable 60 on a side of the arm main body portion 21a is covered by an arm cover 39 attached to the arm main body portion 21a.

Here, as illustrated in FIG. 2, the power supply unit for the electric motor 30 has a pair of batteries 62A and 62B which store power, and a power drive unit (PDU) 63 which converts DC power of these batteries 62A and 62B into AC power. The three-phase electric wires 60u, 60v, and 60w of the electric cable 60 are connected to the power drive unit 63. In addition, the batteries 62A and 62B and the power drive unit 63 are connected to each other through different electric cables (not illustrated).

The power drive unit 63 is disposed in a region surrounded by the left and right down frame portions 14a of the lower frames 14 and the left and right upper frames 13 of the vehicle body frame F, and it is positioned in an inward region between the left and right middle frames 16 in the vehicle width direction. The power drive unit 63 is disposed in a space portion below the center tunnel 10 in a state of inclining slightly forward.

The batteries 62A and 62B are disposed side by side in the front-rear direction inside a battery storage device 64 provided below the seat 8. Both the batteries 62A and 62B are formed to have substantially rectangular parallelepiped shapes and have the same constitutions. The batteries 62A and 62B are wired in series, so that a predetermined high voltage (for example, 48 V to 72 V) can be obtained. For example, the batteries 62A and 62B are constituted of lithium-ion batteries as energy storages capable of charging and discharging.

In addition, the electric motor 30 is controlled by a control unit (not illustrated). The control unit receives information from a throttle opening sensor and the like (not illustrated) and outputs a predetermined control signal to a driver of the electric motor 30 in accordance with operation intention of a rider, traveling conditions, and the like.

In addition, the deceleration mechanism 35 illustrated in FIG. 6 includes a transmission shaft 36 which is pivotally supported parallel to the motor output shaft 31 and the rear wheel axle 4a, a pair of first gears 37a and 37b which are respectively provided in an inner end portion of the motor output shaft 31 in the vehicle width direction and an inward portion of the transmission shaft 36 in the vehicle width direction, and a pair of second gears 38a and 38b which are respectively provided in an outward portion of the transmission shaft 36 in the vehicle width direction and a left end portion of the rear wheel axle 4a. The reference signs 4b to 4d in FIG. 6 indicate bearings rotatably supporting the rear wheel axle 4a.

The motor output shaft 31, the transmission shaft 36, and the rear wheel axle 4a are disposed at intervals in the front-rear direction in order from the front side. The transmission shaft 36 has an axis Ct1 (which will hereinafter be referred to as "a transmission axis Ct1") parallel to the motor axis Cm1. The reference signs 39a and 39b in FIG. 6 indicate bearings rotatably supporting the transmission shaft 36.

Due to the foregoing constitution of the deceleration mechanism 35, rotation of the motor output shaft 31 is decelerated at a predetermined deceleration rate and is transmitted to the rear wheel axle 4a.

Figure 9:
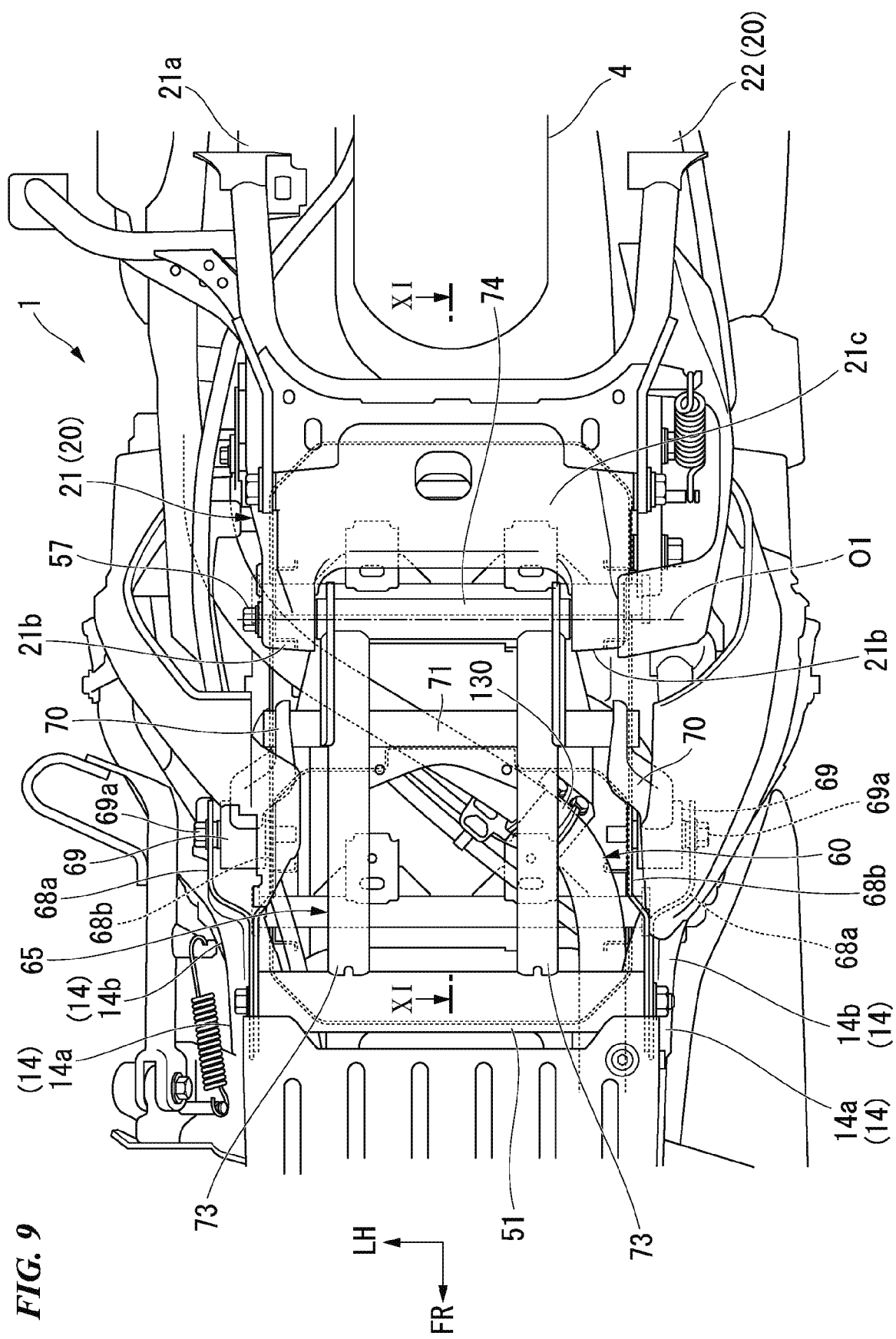
FIG. 9 is a bottom view of the saddle-type electric vehicle according to the embodiment.

FIG. 9 is a view of a part near the support portion of the swing arm 20 viewed from below the vehicle. In addition, FIG. 10 is a view illustrating a cross section cut along line X-X in FIG. 8, and FIG. 11 is a view illustrating a cross section cut along line XI-XI in FIG. 9.

As illustrated in FIG. 8 and these diagrams, an arm support member 65 protruding toward the rear of the vehicle is attached to lower portion regions of the rear frame portions 14b of the left and right lower frames 14. The pivot 57 oscillatably supporting a front portion of the swing arm 20 is held in the vicinity of a rear end portion of the arm support member 65. The arm support member 65, of which a detailed constitution will be described below, is formed to have substantially a triangle shape in a side view in which one vertex sandwiched between two sides protrudes to the rear side of the vehicle. The pivot 57 is held near the vertex protruding to the rear of the vehicle.

Figure 10:
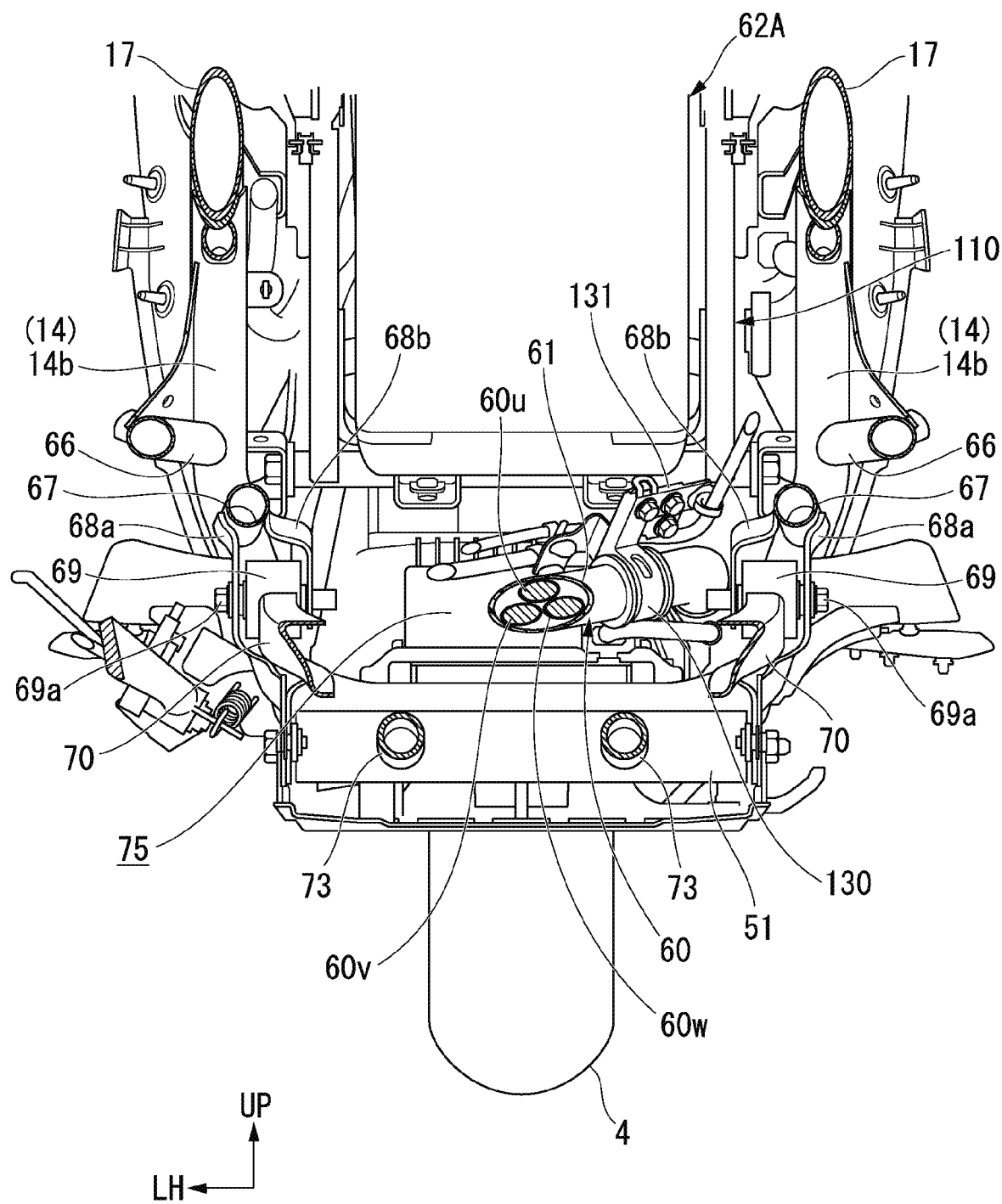
FIG. 10 is a cross-sectional view of the saddle-type electric vehicle according to the embodiment cut along line X-X in FIG. 8.
Figure 11:
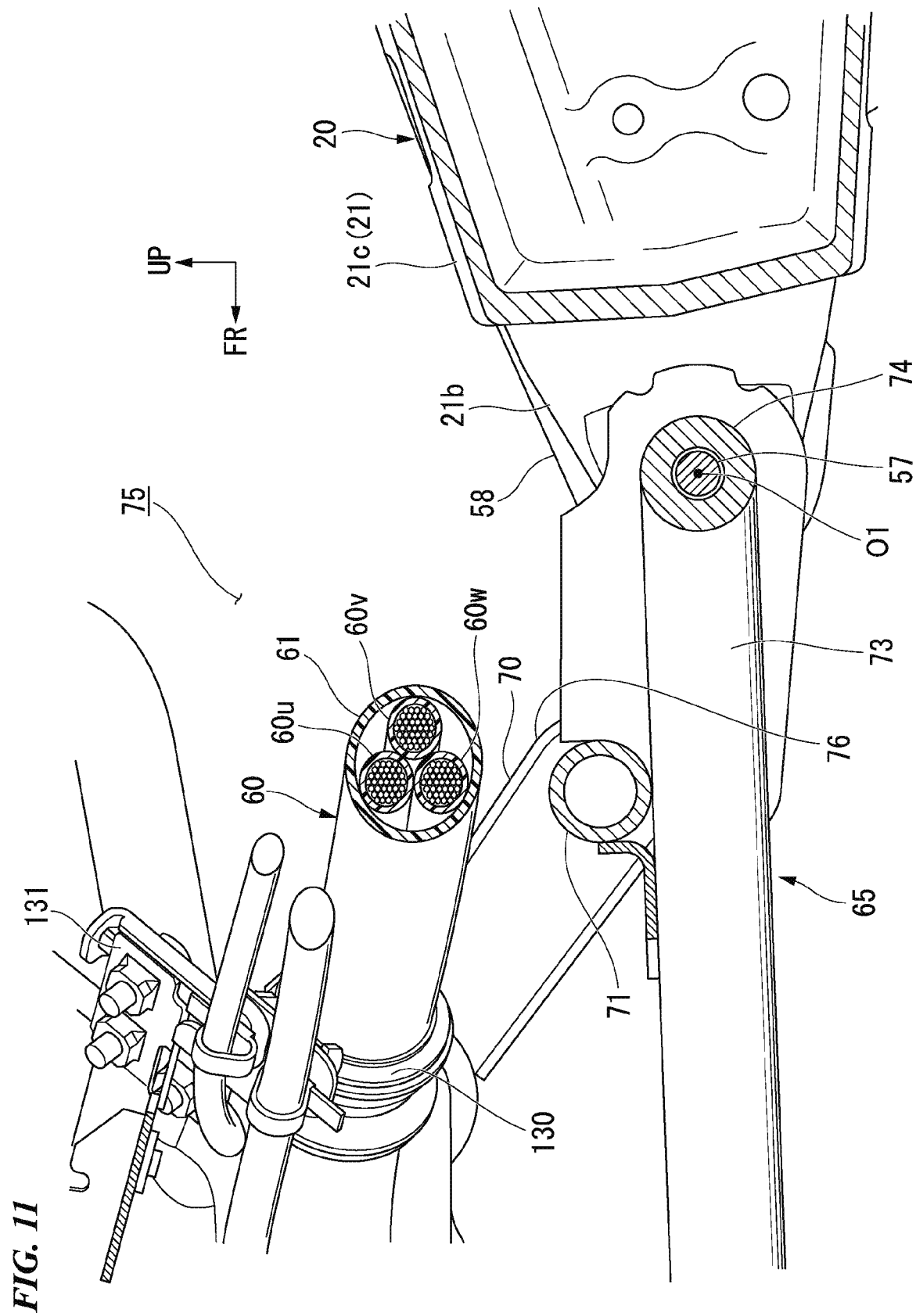
FIG. 11 is a cross-sectional view of the saddle-type electric vehicle according to the embodiment cut along line XI-XI in FIG. 9.

As illustrated in FIGS. 8 and 10, battery support stays 66 for supporting the battery storage device 64 are coupled to the respective left and right rear frame portions 14b of the vehicle body frame F at substantially intermediate positions in the up-down direction. The battery support stays 66 extend toward the rear side of the vehicle body from the rear frame portions 14b. In addition, sub-stays 67 extending upward to the rear are attached at positions slightly below coupling portions of the battery support stays 66 with respect to the left and right rear frame portions 14b. Rear end portions of the sub-stays 67 are coupled to rear portion regions of the battery support stays 66 from below.

A first support bracket 68a and a second support bracket 68b constituted of metal plates are attached to the lower portion region of each of the left and right rear frame portions 14b and the corresponding left or right sub-stay 67. The first support bracket 68a is interlinked to the rear frame portion 14b and an outward region of the sub-stay 67 in the vehicle width direction, and the second support bracket 68b is interlinked to the rear frame portion 14b and an inward region of the sub-stay 67 in the vehicle width direction. As illustrated in FIG. 10, upper portion regions of the first support bracket 68a and the second support bracket 68b are separated from each other with a predetermined distance therebetween, and a bush 69 is disposed inside a space portion of the separation therebetween. Regarding the bush 69, an elastic rubber body (not illustrated) is attached inside a metal tube, and a metal shaft portion 69a is attached to a shaft center portion of the elastic rubber body. The shaft portion 69a penetrates the bush 69 in an axial direction, and the left and right end portions thereof are fastened and fixed to the upper portion regions of the first support bracket 68a and the second support bracket 68b. In addition, an upper support arm 70 extending in a manner of inclining obliquely downward to the rear is joined to an outer surface of the bush 69. As illustrated in FIG. 10, the upper support arm 70 is formed to have substantially a distorted U-shaped cross section and inclines inward in the vehicle width direction toward the rear side of the vehicle body.

The upper support arms 70 integrally coupled to the bushes 69 are provided symmetrically on both sides of the vehicle in the vehicle width direction. End portions of rear portions of the left and right upper support arms 70 are coupled to the respective left and right end portions of a joint rod 71 extending linearly in the vehicle width direction.

In addition, in the first support bracket 68a and the second support bracket 68b, lower portion regions of both thereof are interlinked to each other below the respective left and right rear frame portions 14b. Hereinafter, interlink portions of the lower portion regions will be referred to as "lower interlink portions of the support brackets 68a and 68b". Both end portions of the cross frame 51 extending linearly in the vehicle width direction are coupled to the lower interlink portions of the support brackets 68a and 68b on both sides in the vehicle width direction. The cross frame 51 is formed of a round steel tube having substantially the same diameter as those of the rear frame portions 14b.

A pair of rearward-extending rods 73 extending toward the rear side of the vehicle body are coupled to the cross frame 51. The rearward-extending rods 73 are coupled to a rear side surface of the cross frame 51 at two positions separated from each other on the left and right. A support pipe 74 extending linearly in the vehicle width direction is coupled to the rear end portions of the left and right rearward-extending rods 73. The pivot 57 is turnably inserted through the support pipe 74. Both end portions of the pivot 57 are supported by the left and right extending pieces 21b at the front end of the swing arm 20. Therefore, the front end portion of the swing arm 20 is oscillatably supported by the support pipe 74. In the diagram, the reference sign o1 indicates an axis of the pivot 57 in the vehicle width direction.

In addition, the joint rod 71 to which the rear end portions of the left and right upper support arms 70 are joined is coupled to rear-sided intermediate regions of the left and right rearward-extending rods 73. Therefore, the intermediate regions of the left and right rearward-extending rods 73 are supported by the left and right rear frame portions 14b with a pair of upper support arms 70 extending in a manner of inclining obliquely upward to the front side of the vehicle body therebetween. In the case of the present embodiment, the left and right upper support arms 70 constitute downward-inclining portions extending in a manner of inclining downward to the rear from the rear frame portions 14b.

The arm support member 65 in present embodiment is constituted of the cross frame 51, the rearward-extending rods 73, the support pipe 74, the upper support arms 70, the joint rod 71, and the like which have been described above.

Here, a routing space 75 for routing the electric cable 60 is secured above a region straddling the front portion regions of the arm support member 65 and the swing arm 20. This routing space 75 is a space surrounded by the arm support member 65, the swing arm 20, and the battery storage device 64. In addition, as illustrated in FIGS. 8 and 11, the upper support arms 70 (downward-inclining portions) of the arm support member 65 and the upward inclination portion 58 of the front portion region of the swing arm 20 form a recessed portion 76 having substantially a V shape in a side view. This recessed portion 76 constitutes a part of the routing space 75, such that at least a part of the electric cable 60 is routed therein.

In the arm main body portion 21a of the swing arm 20 on the left side, as illustrated in FIGS. 9 to 11, the electric cable 60 drawn out forward from a connection portion with respect to the electric motor 30 is bent to the right side from a position on the left side in the vehicle width direction near a part above the left side portion of the pivot 57 and is drawn out forward at a position on the right side in the vehicle width direction. The electric cable 60 drawn out forward is connected to the power drive unit 63 in the space portion between the rear frame portions 14b on the front side. As illustrated in FIG. 9, in a region of the electric cable 60 bent to the right side from the left side in the vehicle width direction on the front portion side of the swing arm 20, at least a part is disposed in the routing space 75 such that it overlaps the axis o1 of the pivot 57 in a top view.

In addition, a part of a region of the electric cable 60 bent to the right side from the left side in the vehicle width direction on the front portion side of the swing arm 20 is supported by a lower end of a battery support frame 110 constituting a skeleton portion of the battery storage device 64. Specifically, as illustrated in FIGS. 9 to 11, in a straddling part of the electric cable 60 below the battery storage device 64 from the left to the right, a clamp component 130 for holding the electric cable 60 is attached, and the clamp component 130 is fastened and fixed to a cable support bracket 131 (cable support portion) provided at a lower end of the battery support frame 110.

Figure 12:
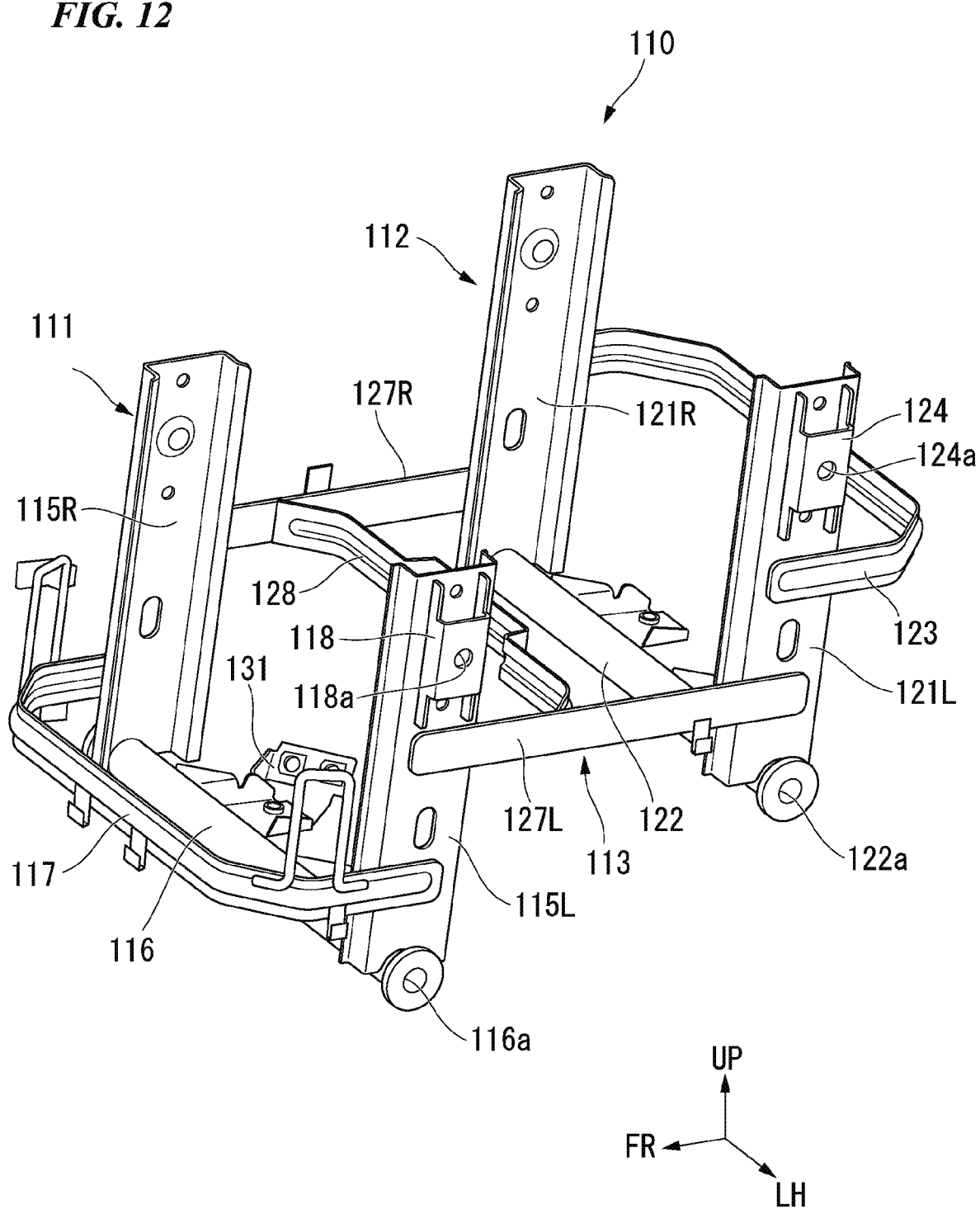
FIG. 12 is a perspective view of a battery support frame of the saddle-type electric vehicle according to the embodiment.

FIG. 12 is a view of the battery support frame 110 viewed from above in front on the left.

As illustrated in FIG. 8, resin case portions 132F and 132R for accommodating the batteries 62A and 62B in an attachable/detachable manner are attached to the inward side of the battery support frame 110. The resin case portions 132F and 132R are disposed side by side in the front-rear direction inside the battery support frame 110. Each of the resin case portions 132F and 132R has an inserting/removing port 136 (refer to FIGS. 13 and 15) opening upward. A battery accommodation portion inside each of the resin case portions 132F and 132R inclines obliquely downward to the front. The batteries 62A and 62B are set inside the resin case portions 132F and 132R when they obliquely slide into the resin case portions 132F and 132R through the inserting/ removing ports 136. The batteries 62A and 62B are obliquely inserted into and removed from the resin case portions 132F and 132R, weights of the batteries 62A and 62B are partially supported by wall portions of the resin case portions 132F and 132R.

The batteries 62A and 62B set inside the resin case portions 132F and 132R are fixed to the resin case portions 132F and 132R and the battery support frame 110 by lock mechanisms 133 (battery fixing means) illustrated in FIG. 8, and terminal portions 41 (refer to FIG. 17, which will be described below) are connected to case side connection terminals 43 (refer to FIG. 17) inside each of the resin case portions 132F and 132R.

As illustrated in FIG. 12, the battery support frame 110 includes a first support frame 111 for supporting the resin case portion 132F (refer to FIG. 8) on the front side, a second support frame 112 for supporting the resin case portion 132R (refer to FIG. 8) on the rear side, and a joint frame 113 for joining the first support frame 111 and the second support frame 112 to each other.

The first support frame 111 has a pair of left and right side frame portions 115L and 115R which extend vertically in a manner of inclining slightly in the front-rear direction along an inclined posture (refer to FIG. 8) of the resin case portion 132F on the front side, a cross pipe 116 which joins the lower end portions of the left and right side frame portions 115L and 115R to each other, and a front frame portion 117 of which both side portions are coupled to the lower portion regions of the left and right side frame portions 115L and 115R. The front frame portion 117 extends in the vehicle width direction in a curved shape projecting forward. The front frame portion 117 is disposed in the front portion region of the resin case portion 132F on the front side.

The left and right side frame portions 115L and 115R extend in a longitudinal direction (substantially in the up-down direction) with a hat-shaped cross section opening on the inward side in the vehicle width direction. Attachment brackets 118 for attaching the battery support frame 110 to the vehicle body frame F (refer to FIG. 8) are provided in upper end portions of the side frame portions 115L and 115R. A female screw portion 118a to which a bolt can be screwed is provided in the attachment bracket 118. The attachment bracket 118 is fastened and fixed to a fixing bracket 105 (refer to FIG. 8 and the like) provided in the corresponding left or right seat frame 15 in front of the rear frame portion 14b of the vehicle body frame F.

A female screw portion 116a to which a bolt can be screwed is provided in both end portions of the cross pipe 116. The cable support bracket 131 described above is coupled to the cross pipe 116. The electric cable 60 is held by the cross pipe 116 of the battery support frame 110 with the cable support bracket 131 therebetween. Both end portions of the cross pipe 116 are fastened and fixed to fixing brackets 106 (refer to FIG. 8 and the like) provided in the corresponding left and right rear frame portions 14b of the vehicle body frame F.

The second support frame 112 has a pair of left and right side frame portions 121L and 121R which extend vertically in a manner of inclining slightly in the front-rear direction along an inclined posture (refer to FIG. 8) of the resin case portion 132R on the rear side, a cross pipe 122 which joins the lower end portions of the left and right side frame portions 121L and 121R to each other, and a rear frame portion 123 of which both side portions are coupled to central regions of the left and right side frame portions 121L and 121R in the up-down direction. The rear frame portions 123 extend in the vehicle width direction in a curved shape projecting rearward. The rear frame portions 123 are disposed in the rear portion regions of the resin case portion 132R on the rear side.

The left and right side frame portions 121L and 121R extend in the longitudinal direction (substantially in the up-down direction) with a hat-shaped cross section opening on the inward side in the vehicle width direction. Attachment brackets 124 for attaching the battery support frame 110 to the vehicle body frame F (refer to FIG. 8) are provided in upper end portions of the side frame portions 121L and 121R. A female screw portion 124a to which a bolt can be screwed is provided in the attachment bracket 124. The attachment bracket 124 is fastened and fixed to a fixing bracket 107 (refer to FIG. 8 and the like) provided in the corresponding left or right support frame 17 of the vehicle body frame F.

A female screw portion 122a to which a bolt can be screwed is provided in both end portions of the cross pipe 122. Both end portions of the cross pipe 122 are fastened and fixed to a fixing bracket 108 (refer to FIG. 8 and the like) provided in the corresponding left or right battery support stay 66 of the vehicle body frame F.

The joint frame 113 has joint side frame portions 127L and 127R for respectively joining the side frame portions 115L and 121L and the side frame portions 115R and 121R of the first support frame 111 and the second support frame 112 on the same sides of the left and the right to each other, and a joint cross frame portion 128 for joining substantially central portions of the left and right joint side frame portions 127L and 127R in the front-rear direction to each other. The resin case portion 132F on the front side is disposed on the front side of the joint cross frame portion 128, and the resin case portion 132R on the rear side is disposed on the rear side of the joint cross frame portion 128.

<Battery Storage Device>

Figure 13:
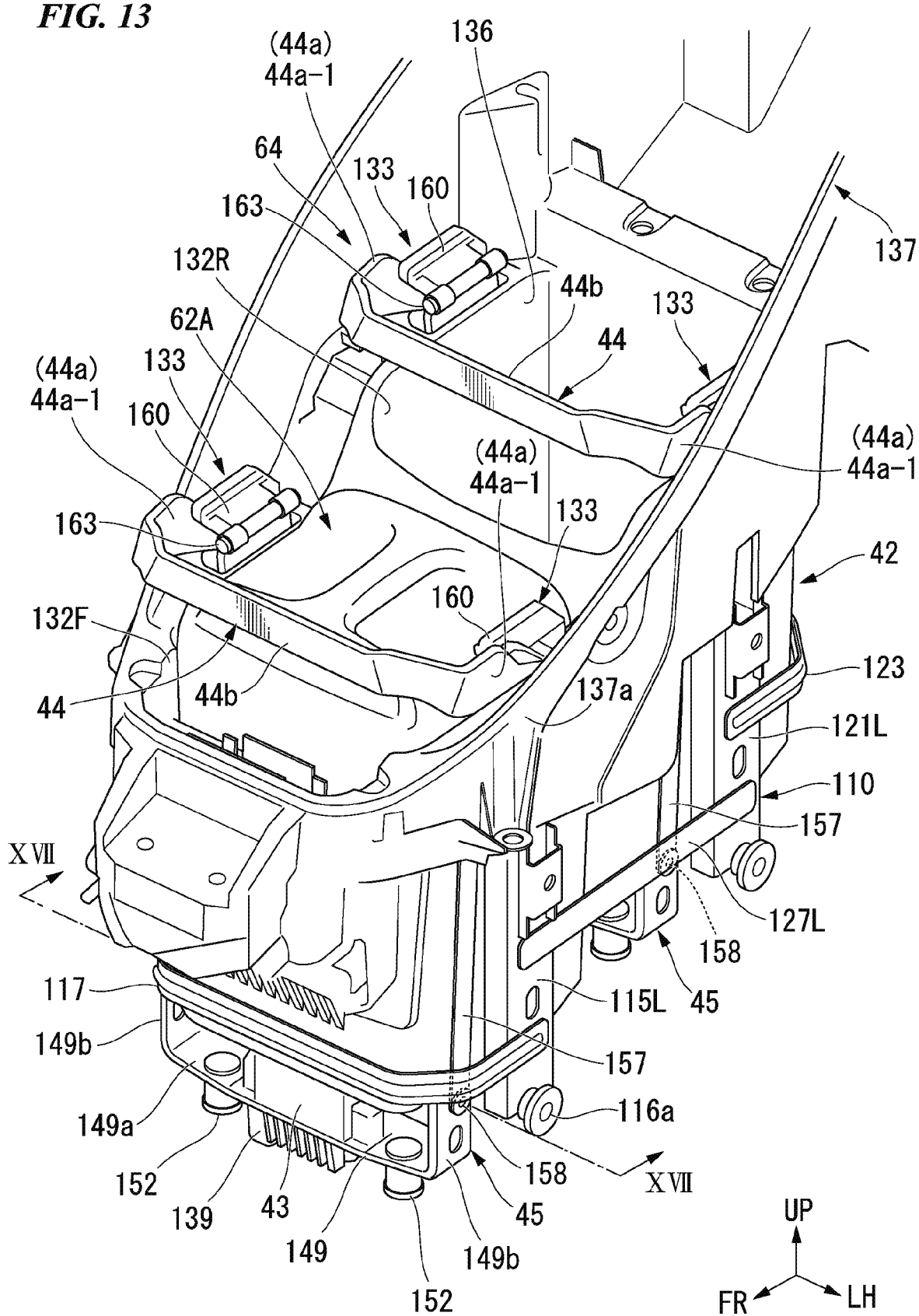
FIG. 13 is a perspective view of a battery storage device according to the embodiment at the time of a non-battery-fixed state.
Figure 14:
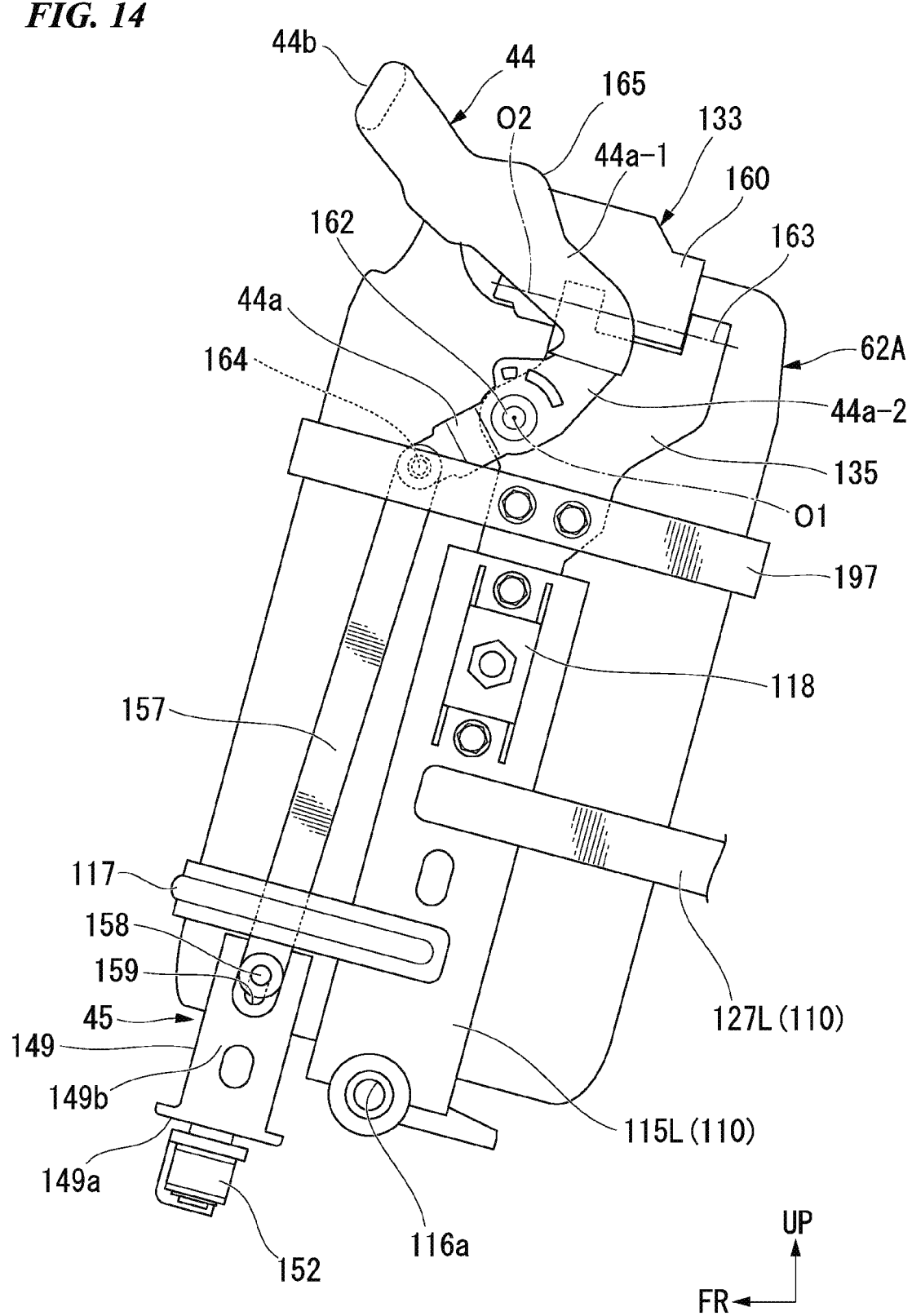
FIG. 14 is a side view of a part of the battery storage device according to the embodiment at the time of the non-battery-fixed state.
Figure 15:
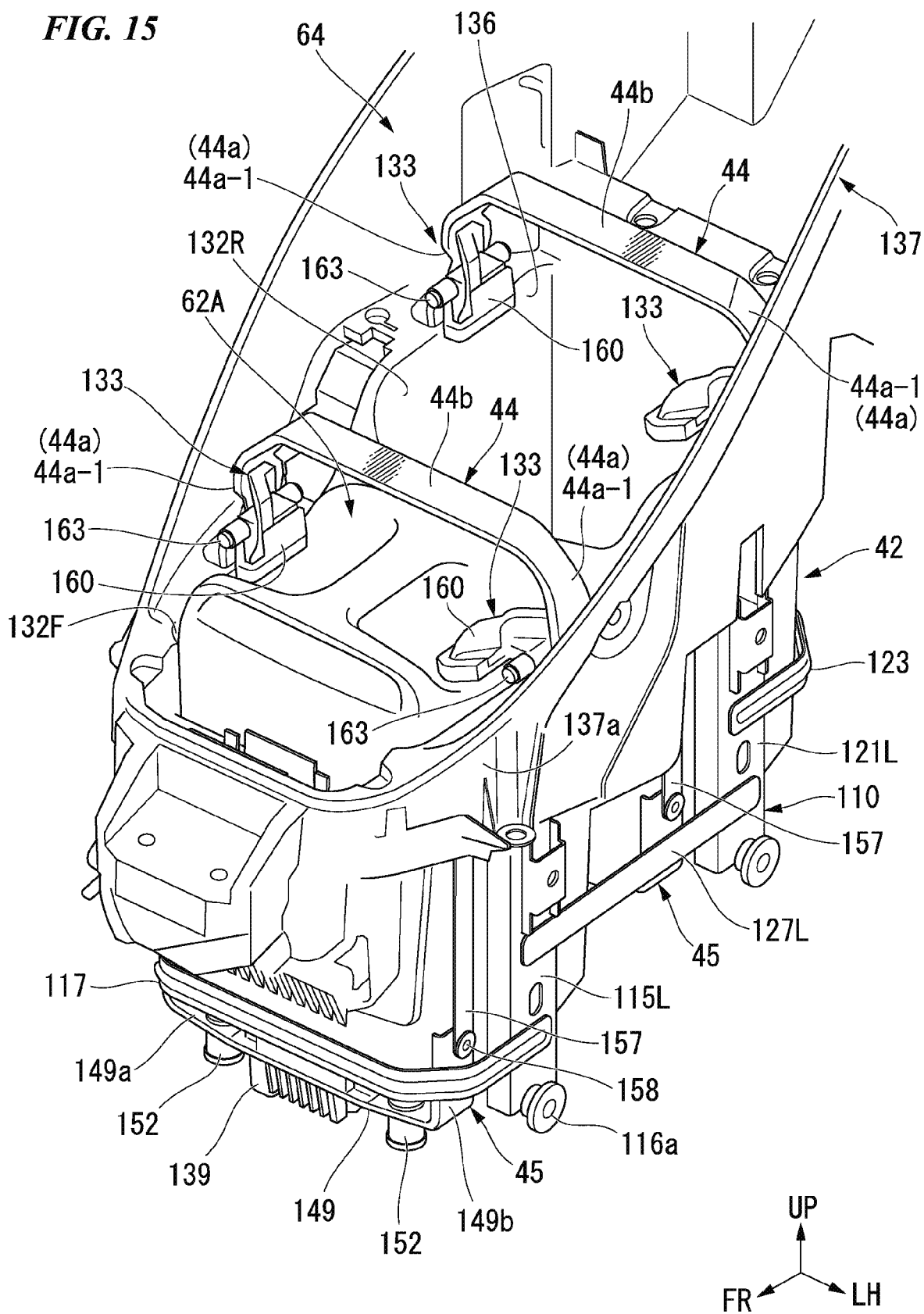
FIG. 15 is a perspective view of the battery storage device according to the embodiment at the time of a battery-fixed state.
Figure 16:
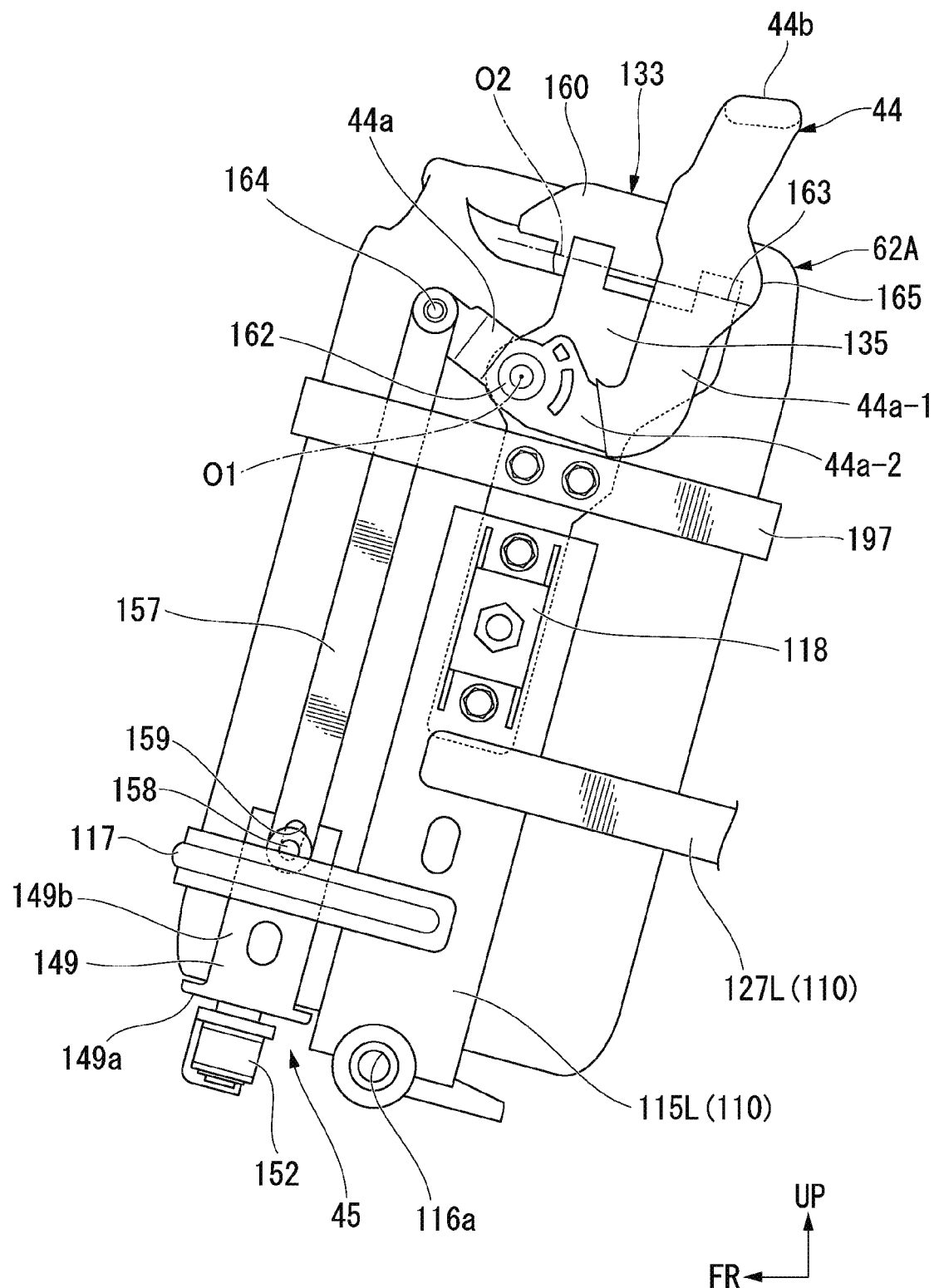
FIG. 16 is a side view of a part of the battery storage device according to the embodiment at the time of the battery-fixed state.
Figure 17:
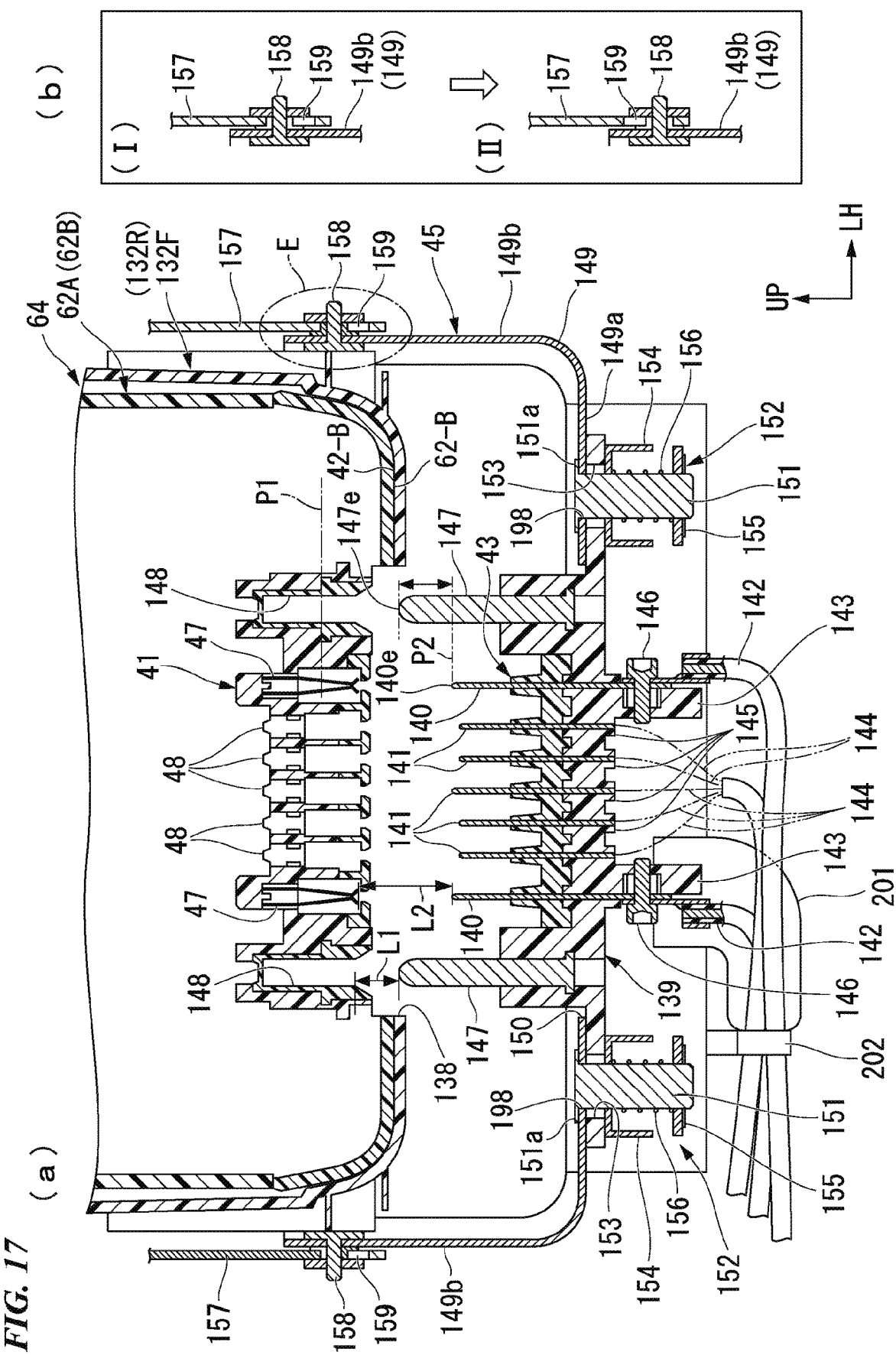
FIG. 17 is a cross-sectional view of the battery storage device according to the embodiment cut along line XVII-XVII in FIG. 13.

FIGS. 13 and 15 are views of the battery storage device 64 viewed obliquely from above in front on the left, and FIGS. 14 and 16 are views of a part of the battery storage device 64 viewed from the left side. FIGS. 13 and 14 illustrate the battery storage device 64 at the time of a non-battery-fixed state, and FIGS. 15 and 16 illustrate the battery storage device 64 at the time of a battery-fixed state. In FIGS. 14 and 16, for the sake of convenience of illustration, the resin case portion 132F is removed. FIG. 17 is a view illustrating a cross section cut along line XVII-XVII in FIG. 13.

As illustrated in FIG. 17, each of the batteries 62A and 62B has the terminal portions 41 inside a recessed portion on a lower surface thereof. The terminal portions 41 are disposed on the front-sided lower surface of each of the batteries 62A and 62B. The terminal portions 41 are electrically connected to the power drive unit 63 and the control unit (not illustrated) through the case side connection terminals 43 provided in the battery storage device 64. The terminal portions 41 supply battery voltages to the electric motor 30 via the power drive unit 63 (refer to FIG. 2) and output information (information of a voltage, a temperature, and the like) of each of the batteries 62A and 62B to the control unit.

The battery storage device 64 includes a battery case 42 which stores the batteries 62A and 62B, the case side connection terminals 43 which are connected to the terminal portions 41 of the batteries 62A and 62B when the batteries 62A and 62B are stored, terminal displacement mechanisms 45 which cause the case side connection terminals 43 to be displaced between a connection position P1 (refer to FIGS. 17, 25, and 26) contact-connected to the terminal portions 41 of the batteries 62A and 62B and a retreat position P2 separated downward from the connection position P1, the lock mechanisms 133 which can fix and hold the batteries 62A and 62B in the battery case 42, and operation levers 44 (operation members) which can switch the lock mechanisms 133 between the battery-fixed state and the non-battery-fixed state and can operate the terminal displacement mechanisms 45.

As illustrated in FIG. 17, the retreat position P2 is a position at which the case side connection terminals 43 are away from the terminal portions 41 of the battery 62A (62B) in an entering direction (downward) of the battery 62A (62B) when a bottom portion 62-B of the battery 62A (62B) abuts a case side abutment portion 42-B of the battery case 42.

The battery case 42 has the battery support frame 110 which has been described above, support stays 135 (refer to FIGS. 14 and 16) which are fastened and fixed to the respective upper portions of the side frame portions 115L and 115R, and 121L and 121R at the front and the rear in the battery support frame 110, and the resin case portions 132F and 132R which are disposed at the front and the rear inside the battery support frame 110. The case side connection terminals 43 and the terminal displacement mechanisms 45 are disposed on the respective lower portion sides of the resin case portions 132F and 132R at the front and the rear. In addition, the operation levers 44 and the lock mechanisms 133 are provided such that they correspond to the case side connection terminals 43 and the terminal displacement mechanisms 45 on the respective lower portion sides of the resin case portions 132F and 132R at the front and the rear. The case side connection terminals 43, the terminal displacement mechanisms 45, the operation levers 44, the lock mechanisms 133, and the like corresponding to the respective resin case portions 132F and 132R at the front and the rear have similar constitutions. Hereinafter, regarding details of these, only those corresponding to the resin case portion 132F on the front side will be described, and description for those corresponding to the resin case portion 132R on the rear side will be omitted.

As illustrated in FIG. 17, the terminal portions 41 of the battery 62A (62B) have a pair of high voltage terminals 47 for outputting power of the battery 62A (62B) to the power drive unit 63, and a plurality of signal terminals 48 for outputting various kinds of information of the battery 62A (62B) to the control unit.

As illustrated in FIGS. 13 and 15, the resin case portions 132F and 132R have the inserting/removing ports 136 opening upward, and the batteries 62A and 62B can be stored and taken out through the inserting/removing ports 136. Both the resin case portions 132F and 132R at the front and the rear incline forward to the lower side. As illustrated in FIG. 8, a bottom wall of each of the resin case portions 132F and 132R inclines downward to the rear.

As illustrated in FIGS. 13 and 15, a circumferential wall 137a of a luggage box 137 is disposed in an upper portion of the battery support frame 110. The luggage box 137 is a resin box in which a box main body is at the rear of the battery storage device 64 and articles can be stored therein. The circumferential wall 137a of the luggage box 137 extends forward from the box main body of the luggage box 137 and surrounds the sides on the left and the right on the upper portion side of the resin case portions 132F and 132R at the front and the rear in the battery storage device 64 and the front of the resin case portion 132F on the front side. The upper portion of the circumferential wall 137a of the luggage box 137 is closed by the seat 8 (refer to FIGS. 1, 27, and 28) on which an occupant sits. The seat 8 can be opened upward and closed downward using the front end side as a hinge pivot point. Upper portions of the luggage box 137 and the battery storage device 64 are opened and closed by the seat 8.

As illustrated in FIG. 17, an opening portion 138 allowing insertion and separation of the case side connection terminals 43 from below is provided in a front-sided bottom wall of the resin case portion 132F (132R). The case side connection terminals 43 and a terminal support block 139 integrally supporting the case side connection terminals 43 are disposed below the opening portion 138 such that they can move upward and downward.

Figure 18:
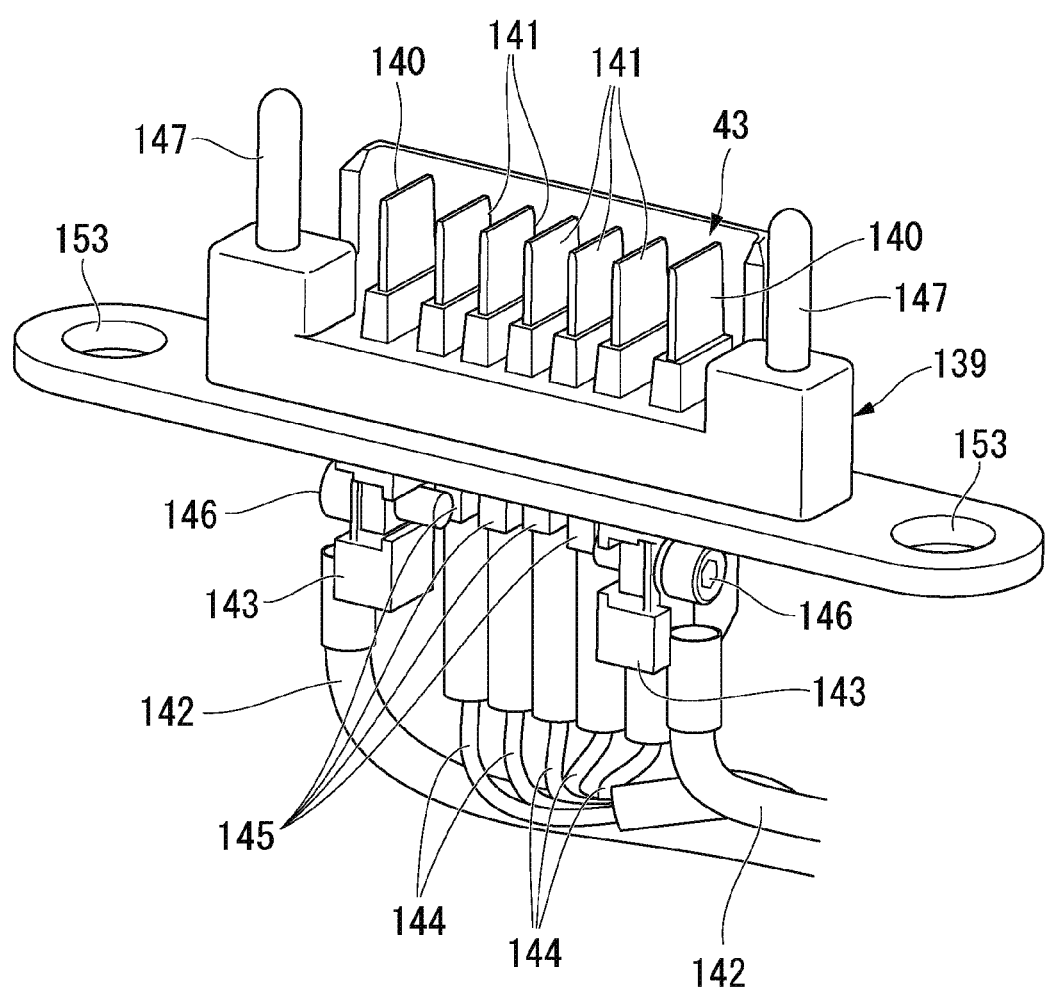
FIG. 18 is a perspective view illustrating a terminal support portion of the battery storage device according to the embodiment.

FIG. 18 is a view of the case side connection terminals 43 and a support portion thereof viewed obliquely from above.

As illustrated in FIGS. 17 and 18, the case side connection terminals 43 include a pair of high voltage terminal pins 140 which can be fitted and connected to the high voltage terminals 47 on the battery 62A (62B) side, and a plurality of signal terminal pins 141 which can be fitted and connected to signal terminals 48 on the battery 62A (62B) side. The high voltage terminal pins 140 and the signal terminal pins 141 are disposed side by side in a row in the vehicle width direction. The high voltage terminal pins 140 are respectively disposed on the outward sides of the plurality of signal terminal pins 141 in the vehicle width direction. In each of the high voltage terminal pins 140 disposed on both sides in the vehicle width direction, the height of the upper end portion is higher than the heights of the upper end portions of the signal terminal pins 141. For this reason, when the case side connection terminals 43 are displaced integrally with the terminal support block 139 from the retreat position P2 to the connection position P1, the high voltage terminal pins 140 come into contact with the terminal portions 41 on the battery 62A (62B) side prior to the signal terminal pins 141.

In addition, cable connection walls 143 for connecting power cables 142 (electric wires) to the high voltage terminal pins 140 and signal wire connection portions 145 for connecting signal wires 144 (electric wires) to the signal terminal pins 141 are provided at a lower end of the terminal support block 139. The cable connection walls 143 are respectively disposed on the outward sides of the signal wire connection portions 145 in the vehicle width direction. Bolts 146 for connecting metal lead wires of the power cables 142 to the high voltage terminal pins 140 are fastened to the cable connection walls 143 from the outward sides in the vehicle width direction. The bolts 146 constitute fixing means for electrically connecting the power cables 142 to the high voltage terminal pins 140 and physically and firmly connecting and fixing the same.

As illustrated in FIG. 17, a cable support bracket 201 is attached to the terminal support block 139. The power cables 142 and the signal wires 144 bundled by a clamp device 202 are held by the cable support bracket 201. The cable support bracket 201 is supported by a stay (not illustrated) protruding downward from a one-sided lower end portion of the terminal support block 139 in the vehicle width direction. The cable support bracket 201 is curved substantially in a J-shape in the vehicle width direction such that it lies in a drawing direction of the power cables 142 and the signal wires 144 after extending downward from the terminal support block 139 side. The clamp device 202 is supported on a distal end side of a curved portion of the cable support bracket 201. A lower end of the cable support bracket 201 and the clamp device 202 are positioned below the cable connection walls 143 and the signal wire connection portions 145 of the terminal support block 139.

A pair of guide projections 147 (case side guide portions) protrude upward at positions on the outward sides of the case side connection terminals 43 of the terminal support block 139 in the vehicle width direction. Each of the guide projections 147 is formed to have substantially a columnar shape in its entirety, and a curved surface having a spherical surface shape or a tapered surface having a tapered shape is provided in a distal end portion thereof. Each of the left and right guide projections 147 protrudes upward beyond the upper end portions of the high voltage terminal pins 140 and the signal terminal pins 141 of the case side connection terminals 43.

Meanwhile, a pair of guide holes 148 which can receive the left and right guide projections 147 on the terminal support block 139 side are provided on the lower surface of the battery 62A (62B) stored in the resin case portion 132F (132R). The guide holes 148 constitute battery-side guide portions. Here, when the case side connection terminals 43 rise toward the connection position P1 (refer to FIGS. 17, 25, and 26) in a state where the battery 62A (62B) is stored inside the resin case portion 132F (132R), the guide projections 147 are inserted into the guide holes 148 before the case side connection terminals 43 are contact-connected to the terminal portions 41 of the battery 62A (62B). In the case of the present embodiment, when the case side connection terminals 43 are at the retreat position P2, the guide projections 147 are set such that a separation distance L1 between the guide projections 147 and abutment portions of the guide holes 148 is shorter than a separation distance L2 between the case side connection terminals 43 and the terminal portions 41 of the battery 62A (62B). As illustrated in FIG. 17, upper ends 147e of the guide projections 147 which are guide ends of the guide projections 147 in a battery direction are formed on a side (battery side) above upper ends 140e of the high voltage terminal pins 140 which are terminal ends of the case side connection terminals 43 in the battery direction.

The terminal displacement mechanism 45 includes a terminal holding member 149 for holding the case side connection terminals 43 with the terminal support block 139 therebetween. The terminal holding member 149 is formed of a metal plate material and has a base wall 149a which extends in the vehicle width direction and a pair of left and right joint walls 149b which are bent and extend to the upper side from both end portions of the base wall 149a in the vehicle width direction. An insertion hole 150 having a long hole shape is formed in a central region of the base wall 149a in the vehicle width direction. The terminal support block 139 is held on a lower surface side of the base wall 149a with joint pins 151 and spring units 152 therebetween. A part of the terminal support block 139 held by the base wall 149a, and the case side connection terminals 43 protrude to the upper side of the base wall 149a through the insertion hole 150.

Insertion holes 153, through which the joint pins 151 are inserted, are formed in both edge portions of the terminal support block 139 in the vehicle width direction. The inner diameters of the insertion holes 153 are formed to be larger than the outer diameters of the joint pins 151. The terminal support block 139 can be displaced substantially in a horizontal direction (direction intersecting a connection direction with respect to the terminal portions 41) within a range of gaps between the insertion holes 153 and the joint pins 151. Therefore, the case side connection terminals 43 supported by the terminal support block 139 are held by the terminal holding member 149 such that they can be relatively displaced in a direction intersecting the connection direction with respect to the terminal portions 41.

The joint pins 151 are inserted into support holes 198 provided in the base wall 149a of the terminal holding member 149 in a slidable manner. Retaining flanges 151a are integrally provided in upper end portions of the joint pins 151. The joint pins 151 are retained with respect to the base wall 149a due to the retaining flanges 151a abutting an upper surface of the base wall 149a.

The spring unit 152 has a metal unit case 154 which has a bottomed cylindrical shape, a stopper plate 155 which has a disk shape such that it can abut an opening end of the unit case 154, and a coil spring 156 which is an elastic member interposed between an inner bottom surface of the unit case 154 and the stopper plate 155. The spring units 152 are disposed below the base wall 149a in a state where outer bottom surfaces of the unit cases 154 abut the lower surface of the base wall 149a. The joint pins 151 penetrate the bottom walls of the unit cases 154 and are coupled to the stopper plates 155 below the unit cases 154. In addition, the coil springs 156 are disposed in surrounding areas of the joint pins 151.

The case side connection terminals 43 and the terminal support block 139 are supported by the terminal holding member 149 in a suspended manner with the spring units 152 and the joint pins 151 therebetween. The unit cases 154 and the stopper plates 155 are maintained in a separated state until a pressing load at a predetermined level or higher is input to the case side connection terminals 43 from above. When a pressing load at a predetermined level or higher is input to the case side connection terminals 43 from this state, the terminal support block 139 compresses the coil springs 156 such that they are displaced, and thus the terminal support block 139 is relatively displaced downward with respect to the terminal holding member 149. In this manner, when the terminal support block 139 is relatively displaced by a predetermined amount or more with respect to the terminal holding member 149, the stopper plates 155 abut the unit cases 154. Accordingly, relative displacement of the terminal support block 139 (case side connection terminals 43) with respect to the terminal holding member 149 is restricted (refer to FIG. 26).

Each of the left and right joint walls 149b of the terminal holding member 149 is turnably held by a lower end of a metal link plate 157 in the lower portion region on the outward side of the side portion of the resin case portion 132F (132R). The link plate 157 is a plate member elongated in one direction extending substantially in the up-down direction. The upper end portion of each of the left and right link plates 157 is turnably joined to a distal end of each of the left and right lever pieces 44a of the operation lever 44 serving as operation members. The intermediate regions of the left and right lever pieces 44a in an extending direction are turnably pivoted by the respective left and right support stays 135 attached to the battery support frame 110. When the operation lever 44 is turnably operated in one direction (clockwise direction in FIGS. 14 and 16), the respective left and right link plates 157 are pulled up to the upper side. Accordingly, each of the left and right joint walls 149b of the terminal holding member 149 is displaced to the upper side. At this time, the case side connection terminals 43 held by the terminal holding member 149 are displaced from the retreat position P2 to the connection position P1.

The reference sign 197 in FIGS. 14 and 16 indicates a reinforced frame which is attached to a part in the vicinity of the lower ends of the left and right support stays 135 and reinforces a surrounding area of the resin case portion 132F (132R).

As illustrated in FIG. 17, the lower ends of the respective left and right link plates 157 and the left and right joint walls 149b of the terminal holding member 149 are associated with each other with turning pins 158 inserted into long holes 159. The turning pins 158 are supported by the respective left and right joint walls 149b, and the long holes 159 are formed in the link plates 157. For this reason, when the link plates 157 are pulled upward due to operation of the operation lever 44, the turning pins 158 freely play inside the long holes 159 as much as the amount of a predetermined stroke of the link plates 157, as illustrated in (I) and (II) of FIG. 17(B). As a result, a timing for the terminal holding member 149 starting upward displacement is delayed with respect to start of operation of the operation lever 44.

FIG. 17(B) is a view illustrating an operation state of the part E in FIG. 17(A).

In addition, the lock mechanism 133 for fixing the battery 62A (62B) to the battery case 42 includes a movable block 160. The movable block 160 is attached to upper end portions of the left and right support stays 135 of the battery case 42 in a turnable (displaceable) manner. When the operation lever 44 is turned from an initial position within a predetermined position range, the movable block 160 receives an operation force from the operation lever 44 and is turned in an upper surface direction of the battery case 42. The movable block 160 is pressed to an upper surface of the battery 62A (62B) and restricts displacement of the battery 62A (62B) in a releasing direction.

Figure 19:
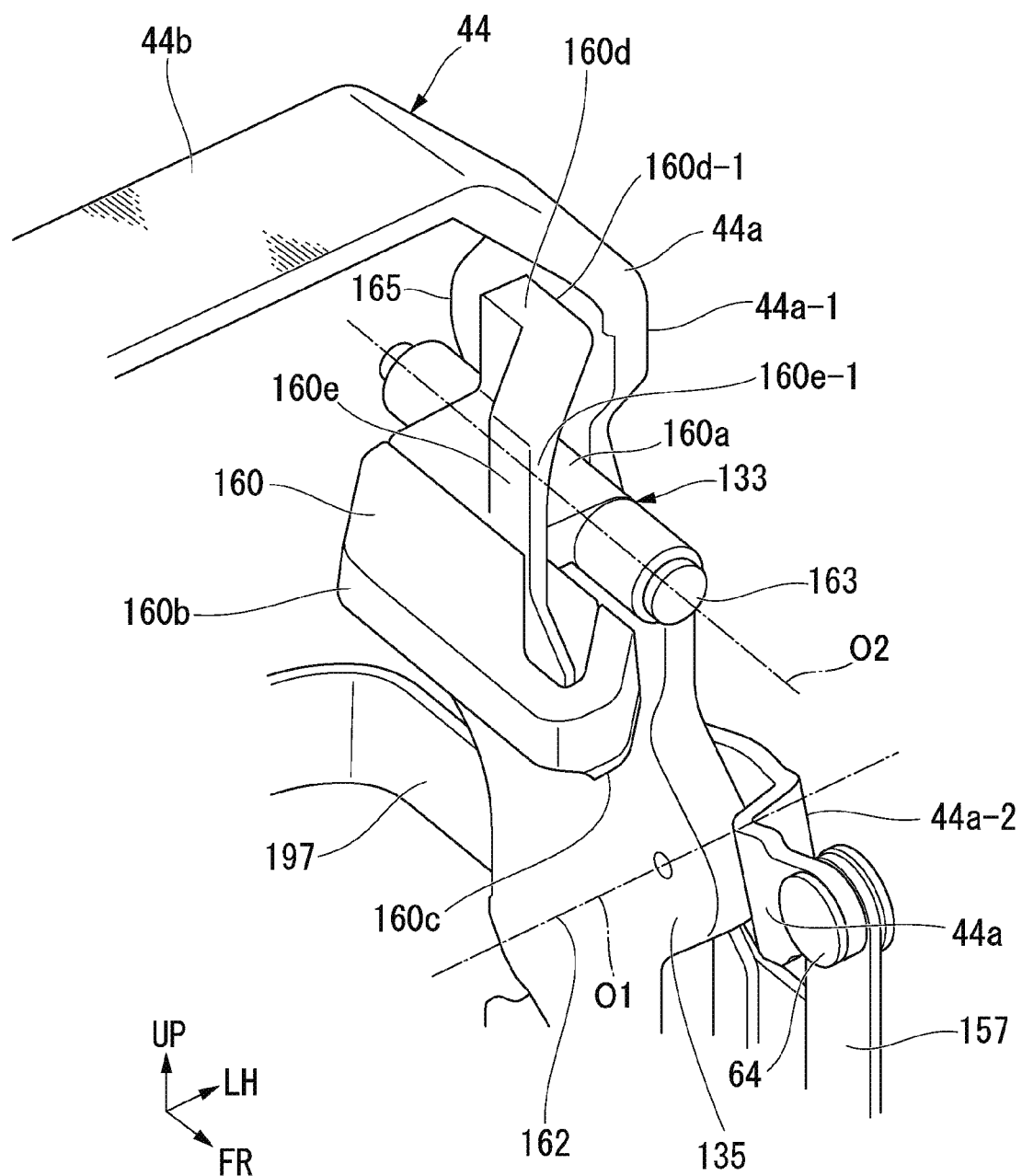
FIG. 19 is a perspective view illustrating a battery fixing portion of the battery storage device according to the embodiment.

FIG. 19 is a view of the operation lever 44 and the movable block 160 viewed from above in front on the right of the support stay 135 on the left side.

The operation lever 44 is turnably supported by the support stay 135 about a first turning shaft 162. The first turning shaft 162 is a shaft which is pivotally supported by a front-sided part substantially at the center of the support stay 135 in the up-down direction and is disposed in the vehicle width direction of the vehicle. In some diagrams, only the shaft center o1 of the first turning shaft 162 is illustrated.

The movable block 160 of the lock mechanism 133 is turnably supported by the support stay 135 about a second turning shaft 163 orthogonal to the first turning shaft 162. The second turning shaft 163 is a shaft which is pivotally supported by the upper end portion of the support stay 135 and is disposed in the front-rear direction of the vehicle.

In the case of the present embodiment, the first turning shaft 162 is disposed such that the axis o1 of the first turning shaft 162 overlaps the battery 62A (62B) stored in the resin case portion 132F (132R) (refer to FIGS. 20(c), 22(c), 24(c), and the like). In addition, the second turning shaft 163 is disposed such that an axis o2 of the second turning shaft 163 is positioned on the outward side of the battery 62A (62B) stored in the resin case portion 132F (132R) (refer to FIGS. 20(c), 22(c), 24(c), and the like).

The operation lever 44 has an operation piece 44b which extends in the vehicle width direction, and the left and right lever pieces 44a which are bent and extend substantially in an orthogonal direction from both end portions of the operation piece 44b. The intermediate regions of the left and right lever pieces 44a in the extending direction are supported by the left and right support stays 135 through the first turning shaft 162. The left and right lever pieces 44a are formed to be bent substantially in an L-shape in a side view (substantially an L-shape in which the distal end portion protrudes forward). Hereinafter, the operation piece 44b side beyond a bent portion of the lever piece 44a will be referred to as a first extending portion 44a-1, and a side opposite to the operation piece 44b beyond the bent portion will be referred to as a second extending piece 44a-2. In the left and right lever pieces 44a, substantially intermediate positions of the second extending pieces 44a-2 in the extending direction are supported by the support stays 135 with the first turning shaft 162 with therebetween. The upper end portions of the link plates 157 are turnably joined to the distal end portions of the second extending pieces 44a-2 with joint pins 164 therebetween.

Here, as illustrated in FIG. 19, the movable block 160 of the lock mechanism 133 has a pivot portion 160a, a displacement restriction wall 160b (battery restriction portion), an elastic body block 160c (battery restriction portion), a holding force receiving wall 160d (holding force receiving portion), and a cam wall 160e. The pivot portion 160a is turnably supported by the second turning shaft 163. The displacement restriction wall 160b is continuously connected to the pivot portion 160a, so that displacement of the battery 62A (62B) in a rising direction can be restricted when it is displaced to the inward region of the resin case portion 132F (132R). The elastic body block 160c is attached to one surface of the displacement restriction wall 160b and directly abuts the upper surface of the battery 62A when the displacement restriction wall 160b restricts displacement of the battery 62A (62B) in the rising direction. At this time, the elastic body block 160c is elastically deformed and causes a repulsive force to act on the upper surface of the battery 62A.

The displacement restriction wall 160b of the movable block 160 and the elastic body block 160c (battery restriction portion) are constituted to be positioned on the outward side of the battery 62A (62B) in the non-battery-fixed state in a view in an insertion direction of the battery 62A (62B) with respect to the resin case portion 132F (132R) (refer to FIG. 20(c)) and to overlap the battery 62A (62B) in the battery-fixed state (refer to FIGS. 22(c) and 24(c)).

The holding force receiving wall 160d is continuously connected to the pivot portion 160a and extends in a direction in which it is substantially at a right angle to the displacement restriction wall 160b around the second turning shaft 163. The holding force receiving wall 160d receives a holding load from the lever pieces 44a of the operation lever 44, and the displacement restriction wall 160b and the elastic body block 160c maintain a state where displacement of the battery 62A (62B) in the rising direction is restricted. The cam wall 160e is a wall connecting both the displacement restriction wall 160b and the holding force receiving wall 160d on the front portion side and has a cam surface 160e-1 smoothly connected in a direction of a rear surface 160d-1 (holding force receiving surface) of the holding force receiving wall 160d from the displacement restriction wall 160b side.

In the case of the present embodiment, the holding force receiving wall 160d (holding force receiving portion) is constituted to overlap the lever piece 44a of the operation lever 44 in the battery-fixed state in a view in a direction along the first turning shaft 162 (refer to FIG. 19).

The movable block 160 of the lock mechanism 133 can be turned between an unlock position at which the displacement restriction wall 160b and the elastic body block 160c are flipped up in accordance with turning operation of the operation lever 44, and a lock position at which the displacement restriction wall 160b and the elastic body block 160c collapse in an inward direction of the resin case portion 132F (132R) by approximately 90°. The lock mechanism 133 is in the non-battery-fixed state when the displacement restriction wall 160b and the elastic body block 160c are at the unlock position, and it is in the battery-fixed state when the displacement restriction wall 160b and the elastic body block 160c are at the lock position. Each of the movable blocks 160 is biased at all times in a flip-up direction by a spring (not illustrated).

At the time of the non-battery-fixed state, the operation lever 44 falls forward to the maximum, and the operation piece 44b of the operation lever 44 at this time is displaced to the front side beyond the inserting/removing port 136 (inner wall) of the resin case portion 132F (132R). The position of the operation lever 44 at this time will be referred to as the initial position. In addition, at the time of the battery-fixed state, the operation lever 44 is raised upward to the rear, and the operation piece 44b of the operation lever 44 at this time is displaced to a position above the inserting/removing port 136 of the resin case portion 132F (132R).

In addition, a cam projection 165 bulging to the rear side is formed in the first extending portion 44a-1 of the lever piece 44a of the operation lever 44. When the operation lever 44 is raised upward to the rear side from the initial position, the cam projection 165 abuts the cam surface 160e-1 of the movable block 160 in a flipped-up state and presses the movable block 160 in a turning direction while it comes into slide contact with the cam surface 160e-1. Accordingly, the movable block 160 is turnably operated toward the lock position from the unlock position. In this manner, when raising operation of the operation lever 44 proceeds and a contact portion of the cam projection 165 reaches a terminal position of the cam surface 160e-1, an inner side surface (surface toward the inward side in the vehicle width direction) of the lever piece 44a abuts the rear surface 160d-1 of the holding force receiving wall 160d of the movable block 160. This state continues until the operation lever 44 reaches a maximum pulling-up operation position.

Incidentally, the lock mechanisms 133 and the terminal displacement mechanism 45 are operated using the common operation lever 44. Further, the operation state of each of the lock mechanisms 133 and the terminal displacement mechanism 45 is determined depending on a turning operation position of the operation lever 44. The terminal displacement mechanism 45 and the lock mechanisms 133 are associated with each other such that the lock mechanisms 133 fix the battery 62A (62B) due to operation of the operation lever 44 and the terminal displacement mechanism 45 causes the case side connection terminals 43 to be displaced to the connection position P1 in the state thereof.

Next, with reference to FIGS. 20 to 26, a series of operations in which the battery 62A (62B) is fixed to the resin case portion 132F (132R) after the battery 62A (62B) is inserted into the resin case portion 132F (132R) and the case side connection terminals 43 are connected to the terminal portions 41 of the battery 62A (62B) will be described.

In the state illustrated in FIG. 20, the operation lever 44 is at the initial position where it falls forward to the maximum. At this time, distal end portions of the lever pieces 44a of the operation lever 44 are positioned at lowermost positions, and the link plates 157 and the terminal holding member 149 of the terminal displacement mechanism 45 are also displaced to the lowermost positions. The battery 62A (62B) is inserted into the resin case portion 132F (132R) in the state thereof. At this time, as illustrated in FIG. 17, the case side connection terminals 43 are positioned at the retreat position P2. In addition, the movable blocks 160 of the lock mechanisms 133 are positioned at the unlock position where they are flipped up.

Figure 21:
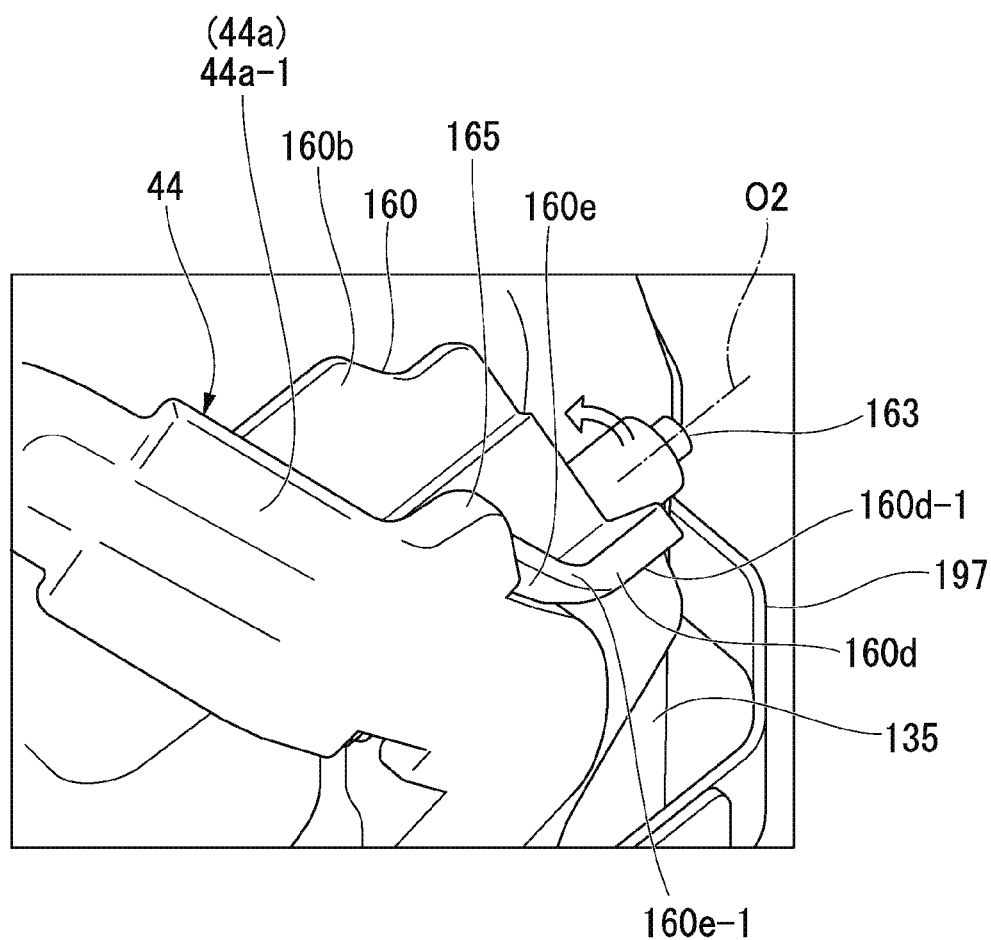
FIG. 21 is a perspective view illustrating the battery fixing portion of the battery storage device according to the embodiment.

When the operation lever 44 is subjected to raising operation from this state, as illustrated in FIG. 21, the cam projections 165 of the operation lever 44 abut the cam surfaces 160e-1 of the movable blocks 160 and turn the movable blocks 160 in a direction of the lock position while they come into slide contact with the cam surfaces 160e-1.

At the beginning of start of operation of the operation lever 44, the link plates 157 are pulled up by the lever pieces 44a. However, since there is a play between the link plates 157 and the terminal holding member 149 due to the long holes 159 as described above, start of rising displacement of the terminal holding member 149 at this time is delayed.

Figure 22:
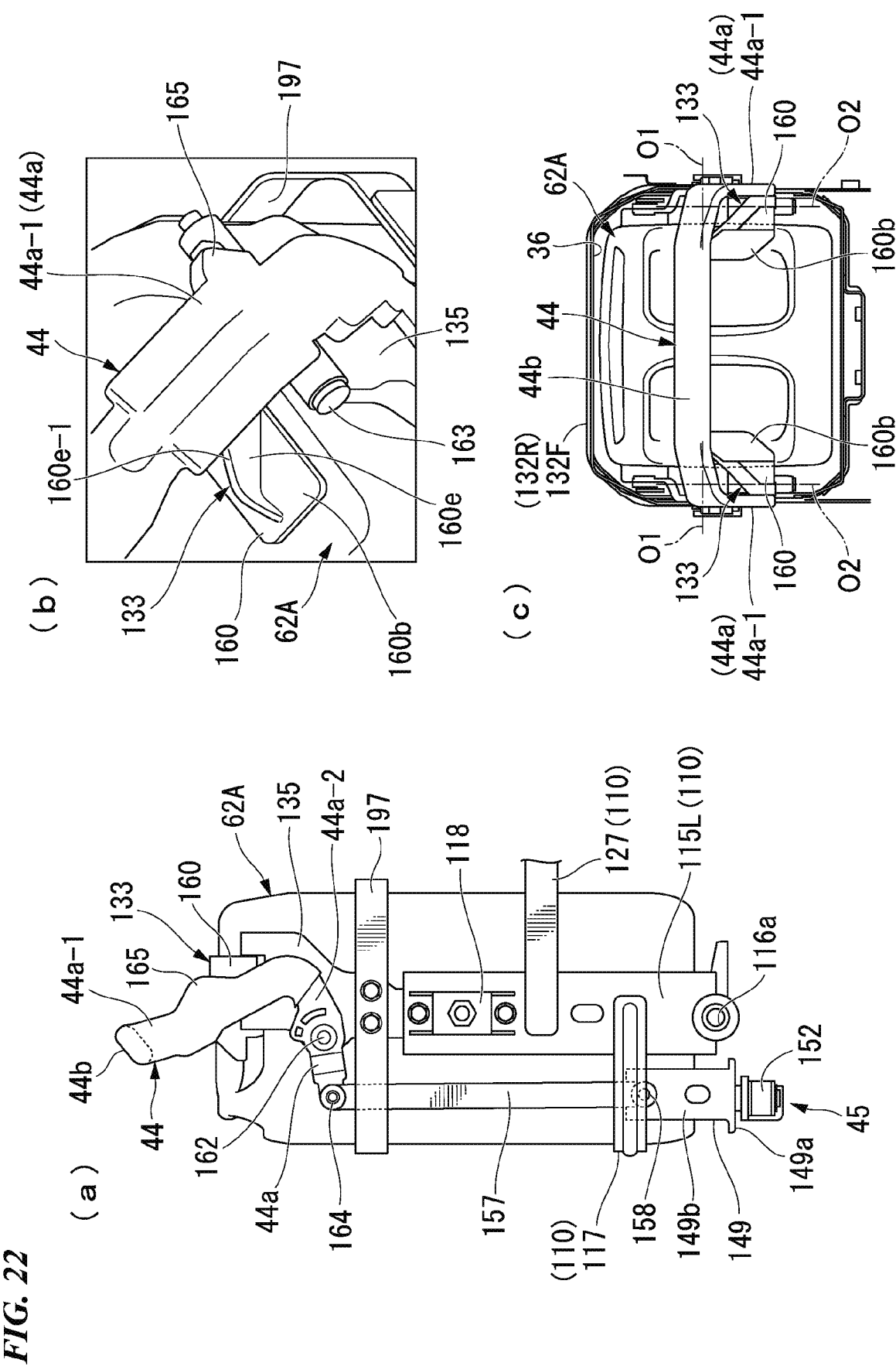
FIG. 22 is a combined view including a side view (a), a perspective view (b), and a top view (c) of the battery storage device according to the embodiment at the time of locking operation of the battery.
Figure 23:
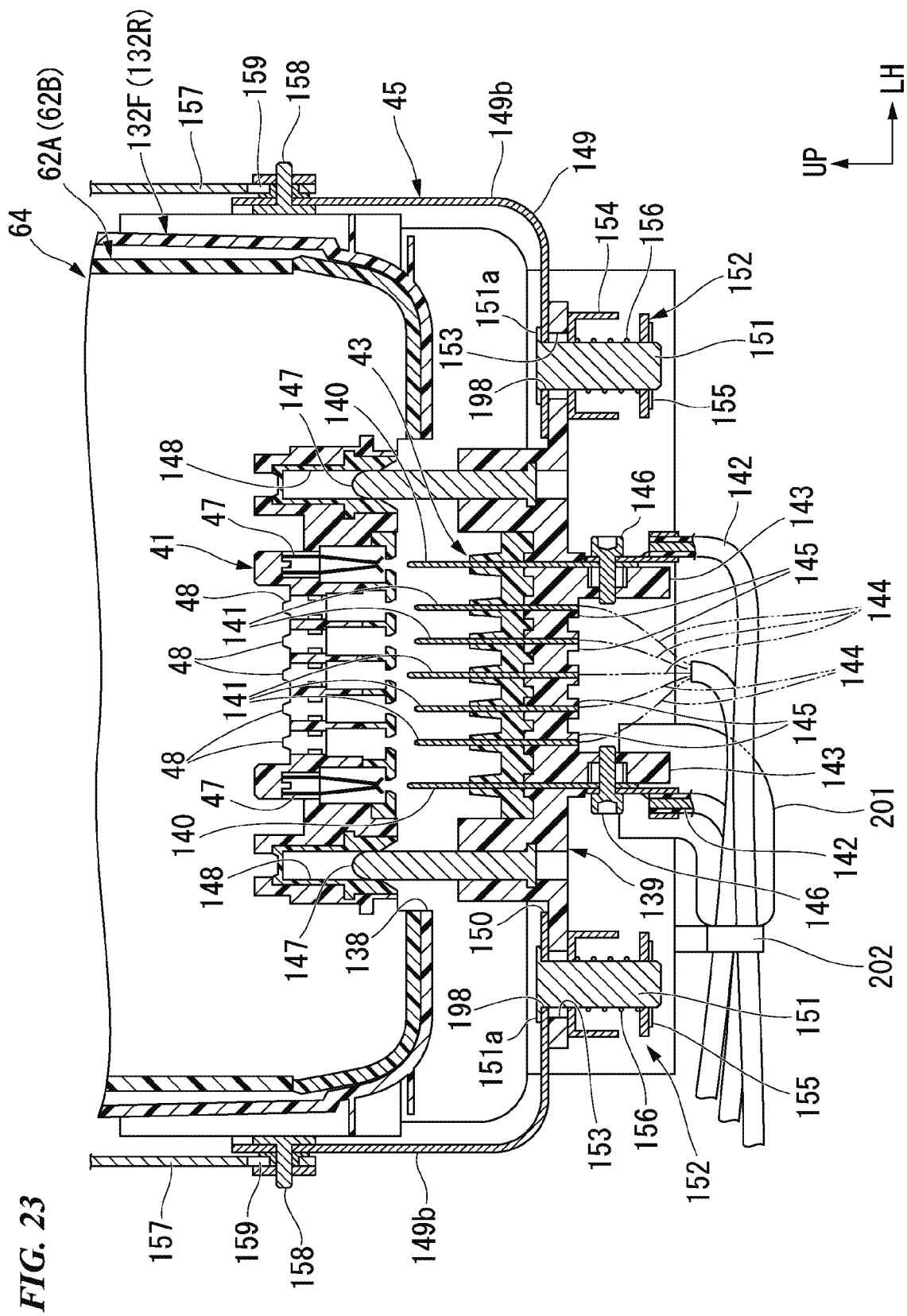
FIG. 23 is a cross-sectional view of the battery storage device according to the embodiment similar to that of FIG. 17 at the time of locking operation of the battery.

When raising operation of the operation lever 44 proceeds, turning of the movable blocks 160 proceeds as illustrated in FIG. 22, and thus the elastic body blocks 160c of the movable blocks 160 abut the upper surface of the battery 62A. At this time, the terminal holding member 149 of the terminal displacement mechanism 45 is pulled up by the operation lever 44 with the link plates 157 therebetween such that it is displaced upward. In addition, at this time, as illustrated in FIG. 23, the guide projections 147 of the terminal support block 139 are fitted into the guide holes 148 on the lower surface side of the battery 62A (62B). Accordingly, the positions of the terminal support block 139 and the case side connection terminals 43 in a direction intersecting a terminal connection direction are subjected to fine adjustment.

Figure 24:
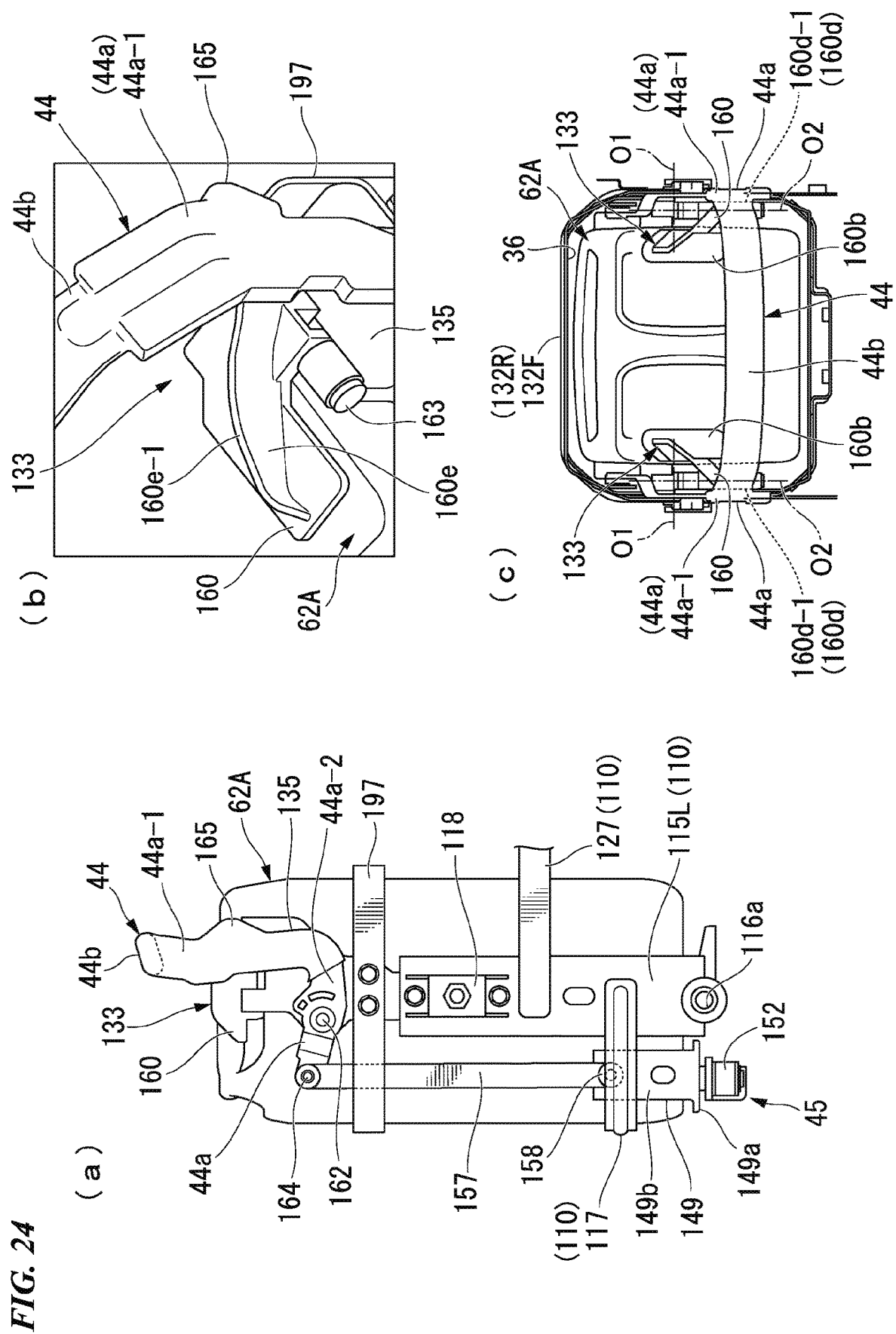
FIG. 24 is combined view including a side view (a), a perspective view (b), and a top view (c) of the battery storage device according to the embodiment at the time of locking operation of the battery.
Figure 25:
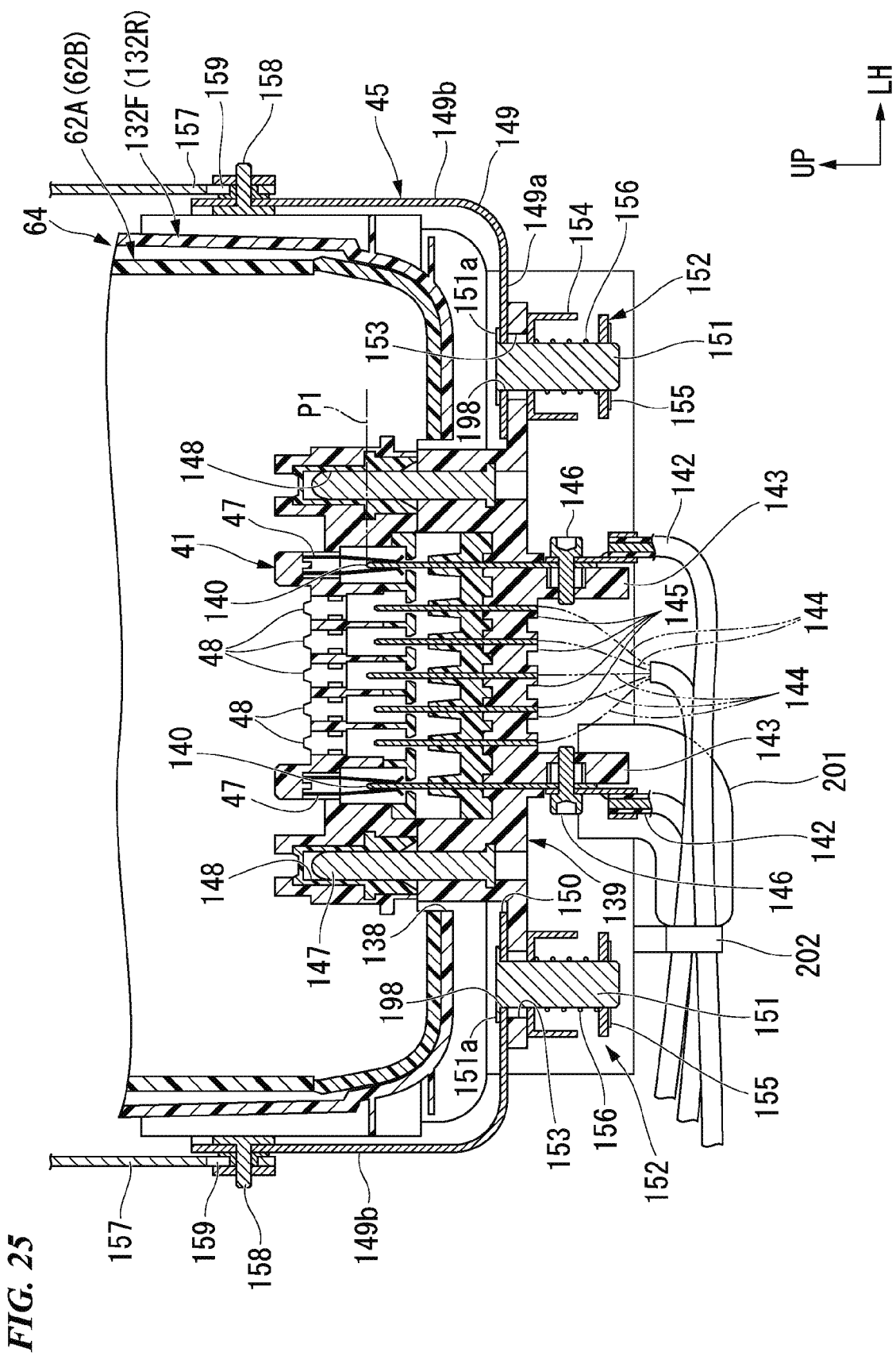
FIG. 25 is a cross-sectional view of the battery storage device according to the embodiment similar to that of FIG. 17 at the time of locking operation of the battery.

When raising operation of the operation lever 44 further proceeds, the lever pieces 44a of the operation lever 44 turn around and abut rear surface sides of the holding force receiving walls 160d of the movable blocks 160, as illustrated in FIG. 24. Accordingly, the displacement restriction walls 160b of the movable blocks 160 turn to a predetermined displacement restriction position, thereby restricting displacement of the battery 62A (62B) in the rising direction with the elastic body blocks 160c therebetween. At this time, as illustrated in FIG. 25, the terminal holding member 149 of the terminal displacement mechanism 45 is pulled up by the operation lever 44 with the link plates 157 therebetween such that it further rises, and the case side connection terminals 43 are displaced to the connection position P1. Accordingly, the case side connection terminals 43 are fitted and connected to the terminal portions 41 of the battery 62A (62B).

Figure 26:
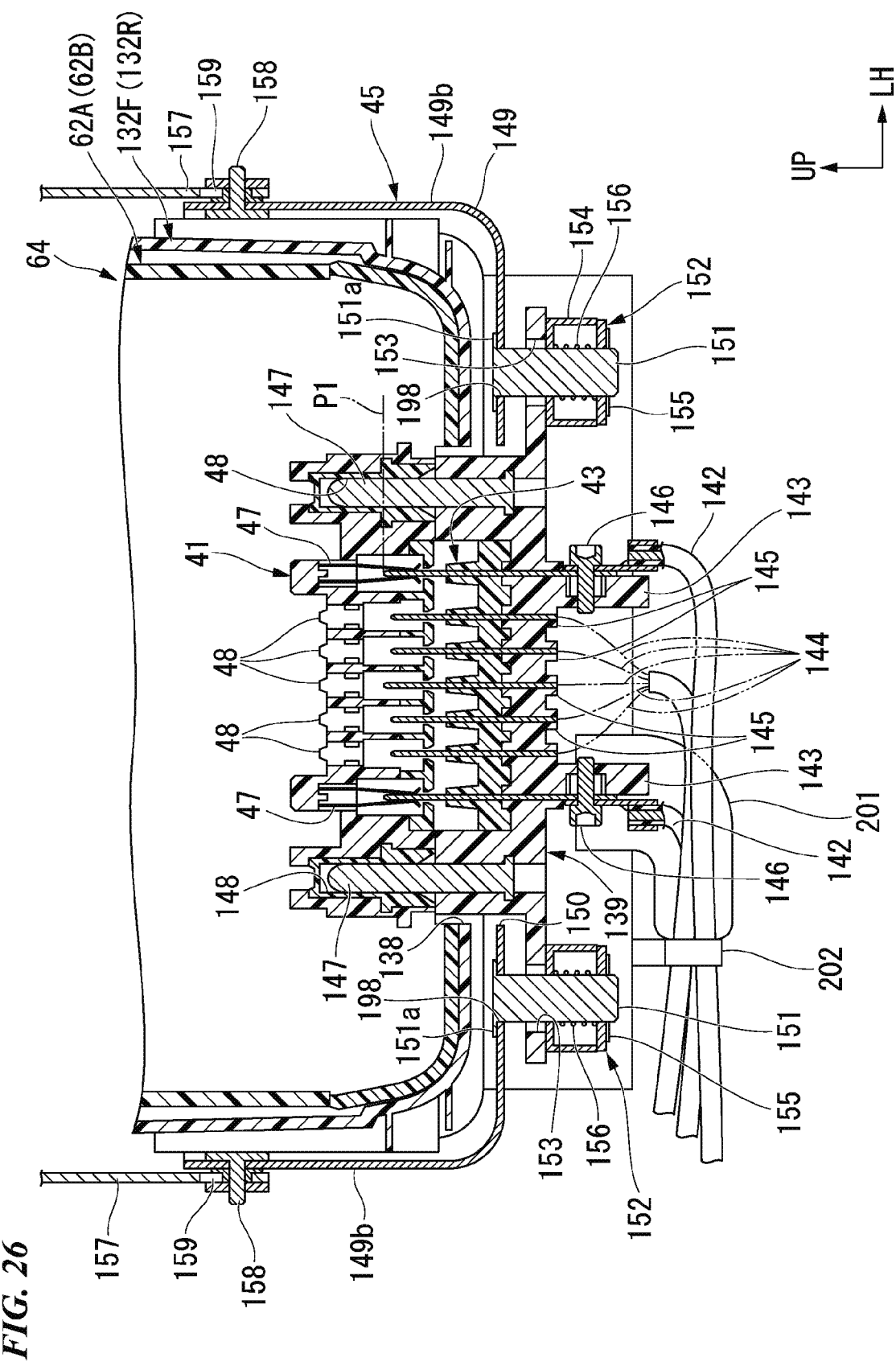
FIG. 26 is a cross-sectional view of the battery storage device according to the embodiment similar to that of FIG. 17 when locking of the battery is completed.

When the operation lever 44 is further operated in a raising direction by a predetermined amount from the state illustrated in FIG. 24, the terminal holding member 149 is further displaced upward in the terminal displacement mechanism 45, as illustrated in FIG. 26. At this time, the coil springs 156 of the spring units 152 are compressed, and the case side connection terminals 43 are pressed to the terminal portions 41 of the battery 62A (62B) with a predetermined load. Accordingly, locking of the battery 62A (62B) by the lock mechanisms 133 and terminal connection by the terminal displacement mechanism 45 are completed.

In the case of the present embodiment, a mechanism, which informs an operator of completion of operation by generating click sounds such as tapping sounds when the operation lever 44 is operated to an operation completion position, is provided at an arbitrary place inside the battery storage device 64.

Figure 27:
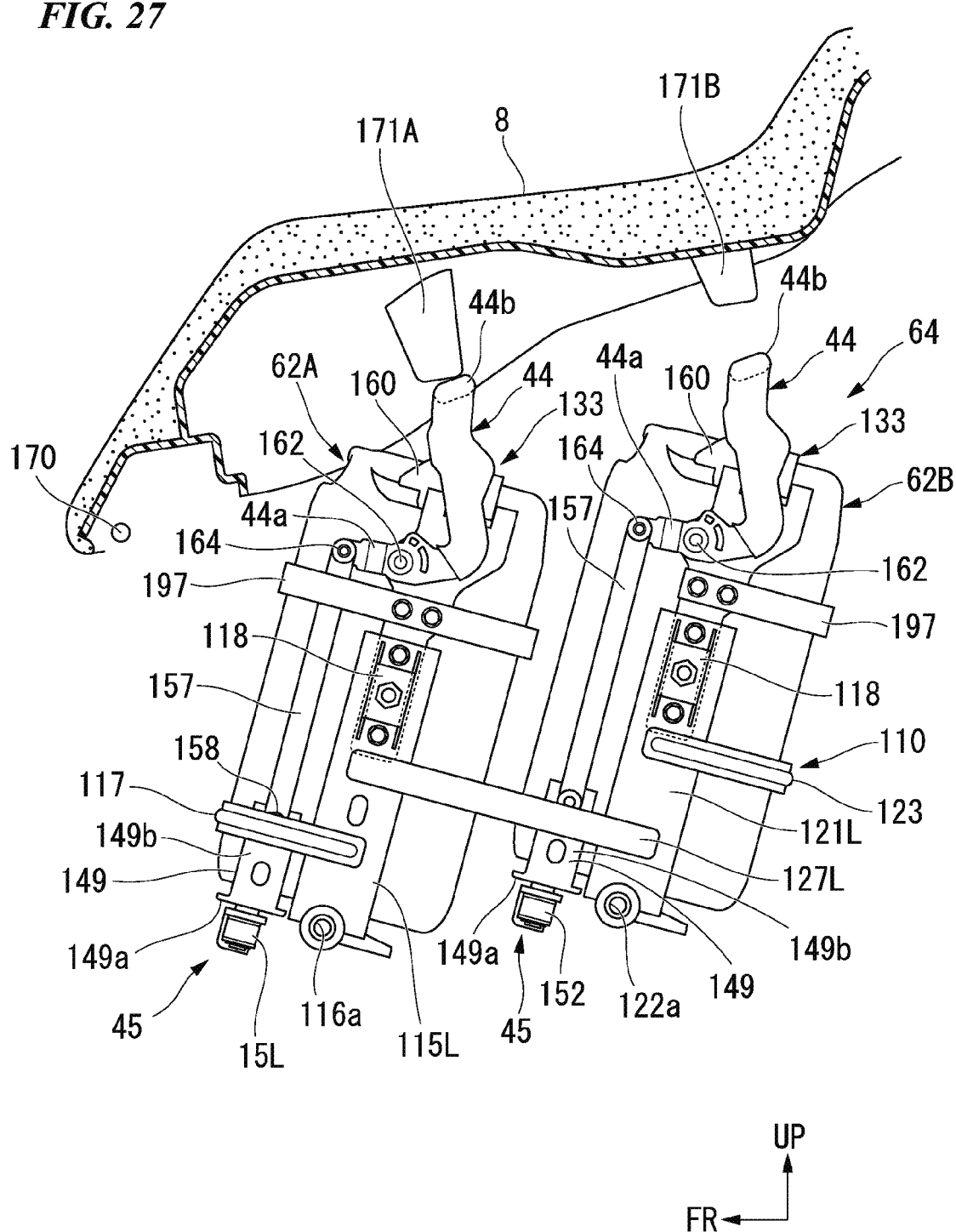
FIG. 27 is a partial cross-sectional side view of the battery storage device according to the embodiment and a seat when locking of the battery is incomplete.
Figure 28:
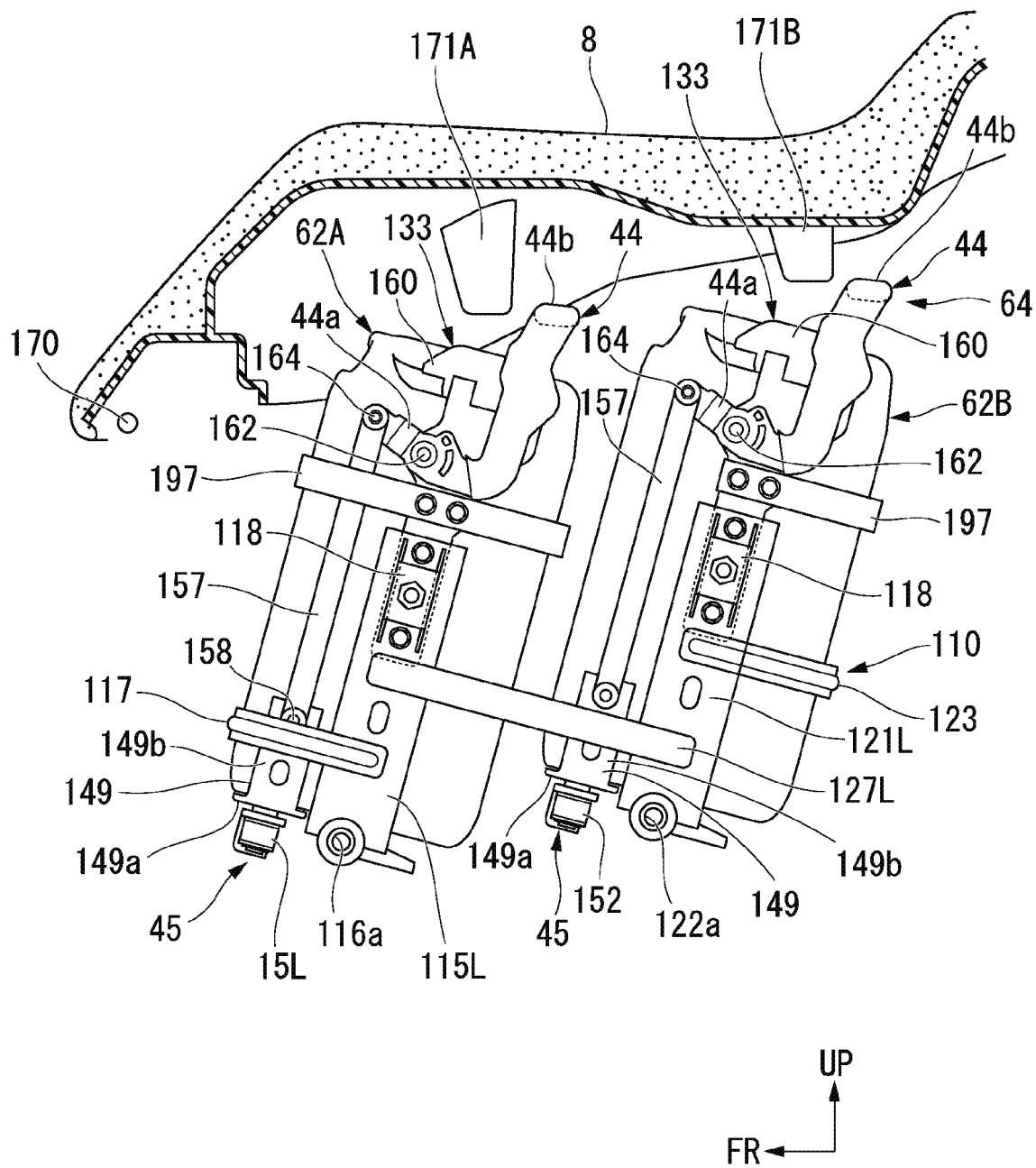
FIG. 28 is a partial cross-sectional side view of the battery storage device according to the embodiment and the seat when locking of the battery is completed.

FIG. 27 is a partial cross-sectional side view illustrating the battery storage device 64 and the seat 8 when the operation lever 44 is in a state before operation is completed. FIG. 28 is a partial cross-sectional side view illustrating the battery storage device 64 and the seat 8 when the operation lever 44 is in a state where operation has been completed.

As illustrated in these diagrams, the seat 8 has a hinge axis 170 lying in the vehicle width direction on the front end portion side and is turnably supported by the vehicle body about the hinge axis 170. In addition, a pair of projections 171A and 171B are provided away from each other in the front-rear direction on a rear surface of the seat 8. The projections 171A and 171B protrude downward from the rear surface of the seat 8. When the operation levers 44 at the front and the rear in the battery storage device 64 are completely operated to the operation completion position (when the operation levers 44 are in a state of being turnably operated to regular positions at which they are in the battery-fixed state) as illustrated in FIG. 28, the pair of projections 171A and 171B are provided such that they enter spaces in front of the respective operation levers 44 without coming into contact with the operation levers 44. In addition, when the operation levers 44 at the front and the rear in the battery storage device 64 are in a state before operation is completed (when the operation levers 44 are in a state at half-fixed positions before they arrive at the regular positions) as illustrated in FIG. 27, the pair of projections 171A and 171B are set such that they abut the upper surfaces of the operation pieces 44b of the operation levers 44. Therefore, when any of the operation levers 44 is not completely operated to the operation completion position, closing of the seat 8 is hindered by the projection 117A or 117B. For this reason, a worker can be informed that the operation levers 44 have not reached the operation completion position.

Depending on the positions of the operation levers 44, the projections 171A and 171B abut the upper surfaces of the operation pieces 44b of the operation levers 44 at the time of closing operation of the seat 8, and thus the operation levers 44 can be subjected to thrust operation to the operation completion position.

In addition, in the case of the present embodiment, when the operation levers 44 at the front and the rear are at the initial positions, the projections 117A and 117B on the seat 8 side are set such that they do not enter the spaces behind the operation levers 44 and do not come into contact with the operation levers 44.

As described above, the battery storage device 64 of the present embodiment includes the lock mechanism 133 that is capable of fixing and holding the battery 62A or 62B stored in the battery case 42, and the operation lever 44 that can operate the lock mechanism 133. Further, the movable block 160 of the lock mechanism 133 has the displacement restriction wall 160b which restricts displacement of the battery 62A or 62B in the separation direction in a state of being displaced to the battery fixing position, the elastic body block 160c, and the holding force receiving wall 160d which receives a holding force from the operation lever 44 operated within a predetermined positional range.

For this reason, in the battery storage device 64 of the present embodiment, displacement of the battery 62A or 62B in the separation direction is restricted by the displacement restriction wall 160b of the movable block 160 and the elastic body block 160c in a state where the movable block 160 is displaced to the battery fixing position, and the movable block 160 can be maintained at the battery fixing position by the holding force receiving wall 160d receiving a holding force from the operation lever 44 in the state thereof. Therefore, when the battery storage device 64 of the present embodiment is employed, the battery 62A or 62B can be firmly fixed to the battery case 42.

In the battery storage device 64 of the present embodiment, the operation lever 44 is turnably supported about the first turning shaft 162, and the movable block 160 of the lock mechanism 133 is turnably supported about the second turning shaft 163 orthogonal to the first turning shaft 162. For this reason, when a load in the separation direction is input to the movable block 160 from the battery 62A or 62B in a state where displacement of the battery 62A or 62B in the separation direction is restricted by the displacement restriction wall 160b of the movable block 160 and the elastic body block 160c, the operation lever 44 is unlikely to be displaced integrally with the movable block 160. Therefore, when the battery storage device 64 of the present embodiment is employed, displacement of the battery 62A or 62B in the separation direction can be restricted advantageously.

In addition, in the battery storage device 64 of the present embodiment, the cam surface 160e-1 which comes into slide contact with the operation lever 44 is provided in the movable block 160. When the operation lever 44 turns in one direction about the first turning shaft 162, the movable block 160 receives a turning operation force toward the battery fixing position from the operation lever 44 through the cam surface 160e-1. Further, the cam surface 160e-1 of the movable block 160 is continuously formed with the rear surface 160d-1 of the holding force receiving wall 160d. For this reason, when the operation lever 44 is turnably operated in the lock direction, the operation lever 44 firstly comes into slide contact with the cam surface 160e-1 of the movable block 160 and turns the movable block 160 to the battery fixing position. Thereafter, the operation lever 44 abuts the rear surface 160d-1 of the holding force receiving wall 160d, such that the movable block 160 is maintained at the battery fixing position. Therefore, when this constitution is employed, it is possible to smoothly turn the movable block 160 to the battery fixing position and maintain the fixed state of the battery 62A or 62B through continuous turning operation of the operation lever 44.

In addition, in the battery storage device 64 of the present embodiment, the first turning shaft 162 is disposed such that the axis o1 which is the operation center of the operation lever 44 overlaps the battery 62A or 62B stored in the battery case 42. For this reason, the operation center of the operation lever 44 is disposed at a position which does not significantly deviate from the centers of gravity of the battery 62A or 62B that is a heavy article. Therefore, when this constitution is employed, the operation lever 44 can be stably subjected to turning operation.

Moreover, in the case of the battery storage device 64 of the present embodiment, the second turning shaft 163 is disposed such that the axis o2 which is the turning center of the movable block 160 of the lock mechanism 133 is positioned on the outward side of the battery 62A or 62B stored in the battery case 42. For this reason, it is possible to easily avoid interference of the movable block 160 with the battery 62A or 62B when the battery 62A or 62B is inserted into the resin case portion 132F or 132R of the battery case 42 or is taken out from the resin case portion 132F or 132R.

In addition, in the battery storage device 64 of the present embodiment, the displacement restriction wall 160b (battery restriction portion of the movable block 160) and the elastic body block 160c are constituted to be positioned on the outward side of the battery 62A or 62B in the non-battery-fixed state in a view in the insertion direction of the battery 62A or 62B and to overlap the battery 62A or 62B in the battery-fixed state. For this reason, it is possible to avoid interference of the displacement restriction wall 160b or the elastic body block 160c of the movable block 160 with the battery 62A or 62B when the battery 62A or 62B is inserted into the resin case portion 132F or 132R of the battery case 42 or is taken out from the resin case portion 132F or 132R. In addition, displacement of the battery 62A or 62B in the separation direction can be restricted reliably by the displacement restriction wall 160b or the elastic body block 160c of the movable block 160 when the battery 62A or 62B is fixed to the battery case 42.

Moreover, in the battery storage device 64 of the present embodiment, the holding force receiving wall 160d of the movable block 160 is constituted to overlap the lever piece 44a of the operation lever 44 in the battery-fixed state in a view in a direction along the first turning shaft 162. For this reason, a holding force can act efficiently on the movable block 160 from the operation lever 44 in a state where the operation lever 44 is operated such that the lever piece 44a is positioned on the outward side of the holding force receiving wall 160d of the movable block 160 in the vehicle width direction.

In addition, in the battery storage device 64 of the present embodiment, the occupant seat 8 is provided to be turnably flipped up above the battery case 42, and the projections 171A and 171B are provided on the rear surface of the seat 8. Further, the projections 171A and 171B are constituted not to come into contact with the operation lever 44 when the seat 8 is closed in a state where the operation lever 44 is turnably operated to the regular position at which the operation lever 44 is in the battery-fixed state and to abut the operation lever 44 when the seat 8 is closed in a state where the operation lever 44 is at the half-fixed position before the operation lever 44 arrives at the regular position. For this reason, when the operation lever 44 is reliably subjected to turning operation to the regular position, the seat 8 can be smoothly closed without causing the projections 171A and 171B and the operation lever 44 to come into contact with each other. On the other hand, when the operation lever 44 is in a state at the half-fixed position, the projections 171A and 171B on the lower surface of the seat 8 abut the operation lever 44, so that a worker can be informed of insufficient turning operation of the operation lever 44.

In addition, even if the operation lever 44 is in a state at the half-fixed position, depending on a turning stop position of the operation lever 44, the operation lever 44 can also be thrust to the regular position by the projections 171A and 171B at the time of closing operation of the seat 8.

The present invention is not limited to the foregoing embodiment, and various design changes can be made within a range not departing from the gist thereof.

In addition, vehicles employing the battery storage device of the present invention are not limited to motorcycles and can also include saddle-type three-wheel vehicles having two front wheels and one rear wheel, four-wheel vehicles, and the like.

REFERENCE SIGNS LIST

1 Motorcycle (vehicle)
42 Battery case
44 Operation lever (operation member)
62A, 62B Battery
64 Battery storage device
133 Lock mechanism
160 Movable block
160b Displacement restriction wall (battery restriction portion)
160c Elastic body block (battery restriction portion)
160d Holding force receiving wall (holding force receiving portion)
160e-1 Cam surface
162 First turning shaft
163 Second turning shaft o1 Axis
o2 Axis

What is claimed is:

1. A battery storage device of a vehicle comprising:
a battery case that stores a battery;
a lock mechanism that is capable of fixing and holding the stored battery in the battery case; and
an operation member that is constituted separately from the lock mechanism and is capable of performing switching operation of the lock mechanism between a battery-fixed state and a non-battery-fixed state,
wherein the lock mechanism includes a movable block which is supported by the battery case in a displaceable manner,
wherein the movable block has a battery restriction portion which abuts an upper surface of the battery and restricts displacement of the battery in a separation direction in a state of being displaced to a battery fixing position, and a holding force receiving portion which is continuously connected to the battery restriction portion and receives a holding force for maintaining the movable block at the battery fixing position from the operation member in a state where the operation member is operated within a predetermined positional range,
wherein the operation member is turnably supported about a first turning shaft, and
wherein the movable block is turnably supported about a second turning shaft orthogonal to the first turning shaft.

2. The battery storage device of a vehicle according to claim 1,
wherein the movable block has a cam surface which comes into slide contact with the operation member and receives a turning operation force toward the battery fixing position from the operation member when the operation member turns in one direction about the first turning shaft, and the cam surface is continuously formed with the holding force receiving portion.

3. The battery storage device of a vehicle according to claim 1,
wherein the first turning shaft is disposed such that an axis of the first turning shaft overlaps the battery stored in the battery case, and
wherein the second turning shaft is disposed such that the axis of the second turning shaft is positioned on an outward side of the battery stored in the battery case.

4. The battery storage device of a vehicle according to claim 3,
wherein the battery restriction portion is constituted to be positioned on the outward side of the battery in the non-battery-fixed state in a view in an insertion direction of the battery and to overlap the battery in the battery-fixed state.

5. The battery storage device of a vehicle according to claim 3,
wherein the holding force receiving portion is constituted to overlap the operation member in the battery-fixed state in a view in a direction along the first turning shaft.

6. The battery storage device of a vehicle according to claim 1,
wherein an occupant seat is provided to be turnably flipped up above the battery case, and
wherein the seat is provided with projections which do not come into contact with the operation member when the seat is closed in a state where the operation member is turnably operated to a regular position at which the operation member is in the battery-fixed state and abuts the operation member when the seat is closed in a state where the operation member is at a half-fixed position before the operation member arrives at the regular position.

7. A battery storage device of a vehicle comprising:
a battery case that stores a battery;
a lock mechanism that is capable of fixing and holding the stored battery in the battery case; and
an operation member that is capable of performing switching operation of the lock mechanism between a battery-fixed state and a non-battery-fixed state,
wherein the lock mechanism includes a movable block which is supported by the battery case in a displaceable manner,
wherein the movable block has a battery restriction portion which restricts displacement of the battery in a separation direction in a state of being displaced to a battery fixing position, and a holding force receiving portion which receives a holding force for maintaining the movable block at the battery fixing position from the operation member in a state where the operation member is operated within a predetermined positional range,
wherein the operation member is turnably supported about a first turning shaft,
wherein the movable block is turnably supported about a second turning shaft orthogonal to the first turning shaft,
wherein the first turning shaft is disposed such that an axis of the first turning shaft overlaps the battery stored in the battery case, and
wherein the second turning shaft is disposed such that the axis of the second turning shaft is positioned on an outward side of the battery stored in the battery case.

8. A battery storage device of a vehicle comprising:
a battery case that stores a battery;
a lock mechanism that is capable of fixing and holding the stored battery in the battery case; and
an operation member that is constituted separately from the lock mechanism and is capable of performing switching operation of the lock mechanism between a battery-fixed state and a non-battery-fixed state,
wherein the lock mechanism includes a movable block which is supported by the battery case in a displaceable manner,
wherein the operation member is turnably supported about a first turning shaft, and
wherein the movable block has a battery restriction portion which abuts an upper surface of the battery and restricts displacement of the battery in a separation direction in a state of being displaced to a battery fixing position, and a holding force receiving portion which is continuously connected to the battery restriction portion and receives a holding force for maintaining the movable block at the battery fixing position from a side surface, which facing toward in a direction along the first turning shaft, of the operation member in a state where the operation member is operated within a predetermined positional range, the side surface.

* * * * *